(12) United States Patent
Purfuerst et al.

(10) Patent No.: US 9,490,730 B2
(45) Date of Patent: Nov. 8, 2016

(54) CONTROL CIRCUIT AND METHOD FOR CONTROLLING A MULTIPHASE MOTOR

(71) Applicants: Melexis Technologies NV, Tessenderlo (BE); DriveXpert GmbH, Ilmenau (DE)

(72) Inventors: Sandro Purfuerst, Ilmenau (DE); Heiko Grimm, Waltershausen (DE); Viktor Petri, Erfurt (DE)

(73) Assignees: MELEXIS TECHNOLOGIES NV, Tessenderlo (BE); DRIVEEXPERT GMBH, Ilmenau (DE)

( * ) Notice: Subject to any disclaimer, the term of this patent is extended or adjusted under 35 U.S.C. 154(b) by 0 days.

(21) Appl. No.: 14/669,742

(22) Filed: Mar. 26, 2015

(65) Prior Publication Data

US 2015/0311834 A1 Oct. 29, 2015

(30) Foreign Application Priority Data

Mar. 27, 2014 (GB) .................................. 1405568.5

(51) Int. Cl.
*H02H 7/09* (2006.01)
*H02P 6/00* (2016.01)

(52) U.S. Cl.
CPC ................ *H02P 6/002* (2013.01); *H02P 6/28* (2016.02); *H02P 25/092* (2016.02)

(58) Field of Classification Search
CPC .......... H02P 6/002; H02P 6/10; H02P 27/08; H02P 25/08

USPC .................................................... 318/400.22
See application file for complete search history.

(56) References Cited

U.S. PATENT DOCUMENTS

2004/0080296 A1 4/2004 Mir et al.

FOREIGN PATENT DOCUMENTS

EP 0832513 B1 10/2001

OTHER PUBLICATIONS

Great Britain Search Report from Application No. GB1405568.5, Sep. 22, 2014.

*Primary Examiner* — Erick Glass
(74) *Attorney, Agent, or Firm* — Workman Nydegger

(57) ABSTRACT

A circuit for controlling a multiphase SRM motor, comprising for each winding a low-side and a high-side transistor, and a low-side and a high-side diode for, and at least one current sensor, e.g. a single current sensor, arranged in low-side or high-side implementation for measuring a current through a first and second winding, and a controller adapted for configuring the transistors such that: during a first time slot only the first winding is energized while the second winding is freewheeling via a selected freewheeling path, during a second time slot only the second winding is energized while the first winding is freewheeling via a selected freewheeling path, and measuring the first and second current in said time slots. A method of driving said transistors.

17 Claims, 20 Drawing Sheets

"micro-overlap"

CONTROL CIRCUIT AND METHOD FOR CONTROLLING A MULTIPHASE MOTOR

FIELD OF THE INVENTION

The present invention relates to the field of current control in brushless motors. More specifically it relates to circuits and methods of current sensing, regulation and control of Switched Reluctance Motor (SRM) systems.

BACKGROUND OF THE INVENTION

Electric motors are present in a variety of appliances. Changes in polarization between the poles of a rotor and a stator create movement of the rotor. In case of brushless motors, the poles of the stator are magnetized by current circulating through a conductor, which forms a coil (winding) around the pole. The electromotive force stems from the change of stator pole polarization, which attracts the rotor pole. The rotor pole may be ferromagnetic (reluctance motor), or may present high coercivity (hysteresis motors) or may use magnets (permanent magnet motors). In general, the rotor poles tend to align with the stator poles, producing a movement in the rotor while the polarization of the poles change. In case of Switched Reluctance Motors (SRM), torque generation is based on the minimization of the reluctance in air gaps between the stator and rotor by aligning the rotor and stator poles. Windings are usually mounted on stator poles. If current flows through opposite windings in the stator, the rotor aligns because the magnetic circuit tries to minimize the air gap between rotor pole and stator pole. There is a wide range of applications, like in ventilators, pumps, engines, etc.

Electric motors can be powered by a direct-current (DC) source, or by other type of current. In general, a power source is connectable to the electric motor. The windings can be powered in commutation, switching the power from one winding to the next. In particular, brushless DC motors can be driven by pulse-width modulation, which typically provides a square signal of constant amplitude which changes its duty cycle at a given frequency. The PWM signal controls for how long the winding is powered. The commutation between windings can produce torque ripples during fast changes in the motor current, which results in audible noise emission. Current must be carefully controlled, because changes in induction, temperature and others may change the impedance of the windings. Current control is usually required in SRM to reduce torque ripple, hence reducing audible noise. Usually some kind of sensor is introduced to allow current control. Torque or position sensors are sometimes introduced, but these are typically expensive. In other cases, a current sensor is introduced in each winding, notably increasing the number of external components and interconnects and the size of the device particularly in those cases in which switching of current sensor is necessary.

A compromise is the introduction of a current sensor that controls the amount of electrical power being introduced in the motor. For instance, document EP0832513 shows a PWM-controlled motor and a current sensor for sensing power supply current flowing in the motor, for feedback to a PWM controller. This solution improves total current control and uses less space than a current control in each winding, but controlling the driver circuit becomes difficult, especially in phase overlapping mode (see for example FIG. 22). In case of failure or change of conductance of the wiring, the control system will not respond properly either. It would be necessary to improve driving control of DC motors, while minimizing the amount of external components introduced in the system.

SUMMARY OF THE INVENTION

It is an object of embodiments of the present invention to provide a driving circuit and a method for controlling a motor, for example a switched reluctance motor, having at least two windings, or at least three windings, or more than three windings.

It is an object of particular embodiments of the present invention to provide such a driving circuit and method enabling regulation of the motor speed with good torque ripple control.

It is an object of particular embodiments of the present invention to provide such a driving circuit and method requiring only a single current sensor.

It is an object of particular embodiments of the present invention to provide such a driving circuit and method having only two current sensors, but an improved reliability, robustness or accuracy.

The above objective is accomplished by a method and a device according to embodiments of the present invention.

In a first aspect, the present invention provides a circuit for controlling a multiphase motor, the motor comprising a plurality of windings comprising at least a first winding and a second winding, the circuit comprising: for each winding a low-side transistor and a high-side transistor for allowing the windings to be energized; for each winding a low-side diode and a high-side diode for allowing the winding to freewheel from the low-side to the high-side, when said winding is not being energized; at least one current sensor arranged in low-side implementation and/or arranged in high-side implementation for selectively measuring a first current running through said first winding and a second current running through said second winding; a controller adapted for repeatedly configuring the transistors in such a way that: during a first time slot only the first winding is energized, while the second winding is freewheeling via a freewheeling path chosen such that only the first current of the first winding or only the second current of the second winding (L2) is flowing through said at least one current sensor; during a second time slot only the second winding is energized while the first winding is freewheeling via a freewheeling path chosen such that only the other of the first and second current is flowing through said at least one current sensor; and wherein the controller is further adapted for measuring one of the first and second current during said first time slot using said current sensor, and for measuring the other of said first and second current during said second time slot using said current sensor.

It is an advantage of embodiments of the present invention that only a single current sensor, or only two current sensors are required for determining the current selectively flowing through each of the plurality of coils of a multiphase motor.

It is an advantage of embodiments of the present invention that it can be used for driving the coils in non-overlapping mode (seen at macro level), but also for driving the current in overlapping mode (at macro level).

It is an advantage of embodiments of the present invention that current to be measured is measured at a moment in time when said current is the only current flowing through the sensor, such that additions or subtractions or other mathematical calculations can be avoided.

It is an advantage of embodiments of the present that the generation of the drive waveforms can be provided primarily in hardware (e.g. using PWM modules capable of left aligning and/or right aligning), thus simplifying the implementation.

It is an advantage of embodiments of the present invention that no extra switching is needed for switching sensing functions between sensors. This can at least limit the required number of sensor switches (e.g. ADC multiplexer channels) and/or switching cycles.

It is a further advantage that freewheeling diodes reduce voltage surges from commutation.

It is a further advantage of embodiments of the present invention that two current signals may be measured in parallel within one PWM period.

It is an advantage of embodiments of the present invention that printed circuit board area or semiconductor space may be reduced.

In an embodiment of the circuit, the at least one current sensor is arranged in low-side implementation and is directly connected to the low-side diodes, and the control unit is adapted for configuring the switches in such a way that: during a first time slot only the first winding is energized while the second winding is freewheeling via its low-side diode such that only the second current of the second winding is flowing through the current sensor; during a second time slot only the second winding is energized while the first winding is freewheeling via its low-side diode such that only the first current of the first winding is flowing through the current sensor; and the controller is further adapted for measuring the second current during said first time slot using said current sensor, and for measuring the first current during said second time slot using said current sensor.

It is an advantage of this embodiment (an example is shown in FIG. 13) that it requires only a single current sensor, thus component costs and board space can be further reduced (as compared to a circuit requiring two current sensors or more than two current sensors.

In an embodiment of the circuit, the at least one current sensor is arranged in low-side implementation and is directly connected to the low-side transistors, and the control unit is adapted for configuring the transistors in such a way that: during a first time slot only the first winding is energized while the second winding is freewheeling via its high-side diode such that only the first current of the first winding is flowing through the current sensor; during a second time slot only the second winding is energized while the first winding is freewheeling via its high-side diode such that only the second current of the second winding is flowing through the current sensor; and the controller is further adapted for measuring the first current during said first time slot using said current sensor, and for measuring the second current during said second time slot using said current sensor.

It is an advantage of this embodiment (an example is shown in FIG. 15) that it requires only a single current sensor, thus component costs and board space can be further reduced (as compared to a circuit requiring two current sensors.

In an embodiment of the circuit, the at least one current sensor is arranged in high-side implementation and is directly connected to the high-side transistors, and the control unit is adapted for configuring the transistors in such a way that: during a first time slot only the first winding is energized while the second winding is freewheeling via its high-side diode such that only the second current of the second winding is flowing through the current sensor; during a second time slot the second winding is energized while the first winding is freewheeling via its high-side diode such that only the first current of the first winding is flowing through the current sensor; and wherein the controller is further adapted for measuring the second current during said first time slot using said current sensor, and for measuring the first current during said second time slot using said current sensor.

It is an advantage of this embodiment (an example is shown in FIG. 14) that it requires only a single current sensor, thus component costs and board space can be further reduced (as compared to a circuit requiring two or more current sensors).

In an embodiment of the circuit, the at least one current sensor is arranged in high-side implementation and is directly connected to the high-side transistors, and the control unit is adapted for configuring the transistors in such a way that: during a first time slot only the first winding is energized while the second winding is freewheeling via its low-side diode such that only the first current of the first winding is flowing through the current sensor; during a second time slot only the second winding is energized while the first winding is freewheeling via its low-side diode such that only the second current of the second winding is flowing through the current sensor; and the controller is further adapted for measuring the first current during said first time slot using said current sensor, and for measuring the second current during said second time slot using said current sensor.

It is an advantage of this embodiment (an example is shown in FIG. 12) that it requires only a single current sensor, thus component costs and board space can be further reduced (as compared to a circuit requiring two current sensors).

In an embodiment, the at least one current sensor consists of a first current sensor and a second current sensor, the first current sensor being arranged in high-side implementation and being directly connected to the high-side transistors, the second current sensor being arranged in low-side implementation and being directly connected to the low-side diodes, and wherein the controller is adapted for configuring the transistors in such a way that: during a first time slot only the first winding is energized while the second winding is freewheeling via its low-side diode such that only the first current is flowing through the first current sensor and such that only the second current of the second winding is flowing through the current sensor; during a second time slot only the second winding is energized while the first winding is freewheeling via its low-side diode such that only the first current of the first winding is flowing through the second current sensor and such that only the second current of the second winding is flowing through the first current sensor; and wherein the controller is further adapted for measuring a first version of the first current during said first time slot using said first current sensor, and for measuring a first version of the second current during said first time slot using said second current sensor, and for measuring a second version of the first current during said second time slot using said second current sensor, and for measuring a second version of the second current during said second time slot using said first current sensor; and wherein the controller is further adapted for taking a predefined action based on the first version and second version of the first and second current values.

It is an advantage of this embodiment (an example is shown in FIG. 4) that it allows each current through each of the coils to be measured twice, once with each current sensor. This can be used for example for fault detection, and can thus increase reliability and/or robustness.

In an embodiment, the at least one current sensor consists of a first current sensor and a second current sensor, the first current sensor being arranged in high-side implementation and being directly connected to the high-side diodes, the second current sensor being arranged in low-side implementation and being directly connected to the low-side transistors, and wherein the controller is adapted for configuring the transistors in such a way that: during a first time slot only the first winding is energized while the second winding is freewheeling via its high-side diode such that only the first current of the first winding is flowing through the second current sensor and such that only the second current of the second winding is flowing through the first current sensor; during a second time slot only the second winding is energized while the first winding is freewheeling via its high-side diode such that only the first current of the first winding is flowing through the first current sensor and such that only the second current of the second winding is flowing through the second current sensor; and wherein the controller is further adapted for measuring a first version of the first current during said first time slot using said second current sensor, and for measuring a first version of the second current during said first time slot using said first current sensor, and for measuring a second version of the first current during said second time slot using said first current sensor, and for measuring a second version of the second current during said second time slot using said second current sensor; and wherein the controller is further adapted for taking a predefined action based on the first version and second version of the first and second current values.

It is an advantage of this embodiment (an example is shown in FIG. 3) that it allows each current through each of the coils to be measured twice, once with each current sensor. This can be used for example for fault detection, and can thus increase reliability and/or robustness.

In an embodiment, the at least one current sensor is only a single current sensor.

This offers the advantage of less component count, less mounting space, less readout circuitry, less board space, or any combination hereof.

In an embodiment, the transistors are MOSFETS.

In such advantageous embodiments of the present invention, the performance of the system may be increased.

In an embodiment, the at least one current sensors comprises at least one shunt resistor-type sensor.

These embodiments of the present invention are advantageous because inexpensive sensors may be used. It is an additional advantage that less sensors may be used, thus saving PCB or semiconductor space.

In an embodiment, the controller is further adapted for: determining a target value for the first current and a target value for the second current; testing whether the measured first respectively second current is smaller or larger than a first respectively second target value, and depending on the result of the test, adapting the duration of the first and/or the second time period for increasing or decreasing the first and/or second current.

It is an advantage of such embodiments that it allows the current to describe particular waveforms (e.g. trapezoidal waveforms), by adapting the duration of the first and second time period, which is a simple operation.

In an embodiment, the controller comprises at least: a first PWM-module capable of providing a left-aligned PWM-signal, and a second PWM-module capable of providing a right-aligned PWM signal, and a programmable processor programmed for configuring the first PWM-module for generating a left-aligned PWM signal for controlling the high-side transistor of the first winding, and for configuring the second PWM-module for generating a right-aligned PWM signal for controlling the high-side transistor of the second winding, thereby defining a relative duration of the first and second time slot.

It is an advantage of embodiments with such PWM-modules, that the signal generation can be implemented mainly in hardware, requiring only small processing power.

In a second aspect, the present invention provides a method for driving a multiphase motor, the motor comprising a plurality of windings comprising at least a first winding and a second winding, using a circuit comprising: for each winding a low-side transistor and a high-side transistor for allowing the windings to be energized; for each winding a low-side diode and a high-side diode for allowing the winding to freewheel from the low-side respectively to the high-side when said winding is not being energized; at least one current sensor arranged in low-side implementation and/or arranged in high-side implementation for selectively measuring a first current running through said first winding and a second current running through said second winding; the method comprising the steps of: configuring the transistors in such a way that: during a first time slot only the first winding is energized while the second winding is freewheeling via a freewheeling path chosen such that only the first current of the first winding or only the second current of the second winding is flowing through the current sensor; during a second time slot only the second winding is energized while the first winding is freewheeling via a freewheeling path chosen such that only the other of the first and second current is flowing through the current sensor; measuring one of the first and the second current during said first time slot using said current sensor, and measuring the other of said first and second current during said second time slot using said current sensor.

It is an advantage of embodiments that it allows the motor to be driven with phase-overlapping (at macro-scale), or without phase-overlap (at macro-scale).

It is an advantage of method embodiments of the present invention that common mode signals in the current sensor(s), i.e. superposed current signals that may limit analog measurement range, may be avoided.

It is an advantage that sensing the current through a first winding and through at least a second winding can be done continuously (at any suitable time) with no switching (e.g. multiplexing) of the sensors. Depending on application requirements, inexpensive sensors may be used.

In an embodiment, the method further comprises the step of: determining a target value for the first current and a target value for the second current; testing whether the measured first and second current is smaller or larger than a first and second target value, and depending on the result of the test, adapting the duration of the first and/or the second time period for increasing or decreasing the first and/or second current.

A method according to embodiments of the present invention may further comprise current regulation with an on-off controller. This way, control may be easily implemented by means of a two-point controller.

Alternatively, a method according to embodiments of the present invention may further comprise current regulation with a current controller, such as for instance, but not limited thereto, a PI controller. In such embodiments, the system may be less sensitive to noise in steady state, compared with systems using floating current sensors in series with windings.

In a third aspect, the present invention provides a computer program product for performing a method according to the second aspect, when being executed on at least one controller comprised in a circuit according to the first aspect.

The computer program product may be directly loadable in a memory of a digital processor comprised in a circuit, and may comprise software code portions for performing the steps of the method.

In a fourth aspect, the present invention provides a hardware program product, directly downloadable to a programmable hardware device such as an FPGA, the hardware program product comprising hardware configuration data for configuring the programmable hardware device for performing a method according to the second aspect.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
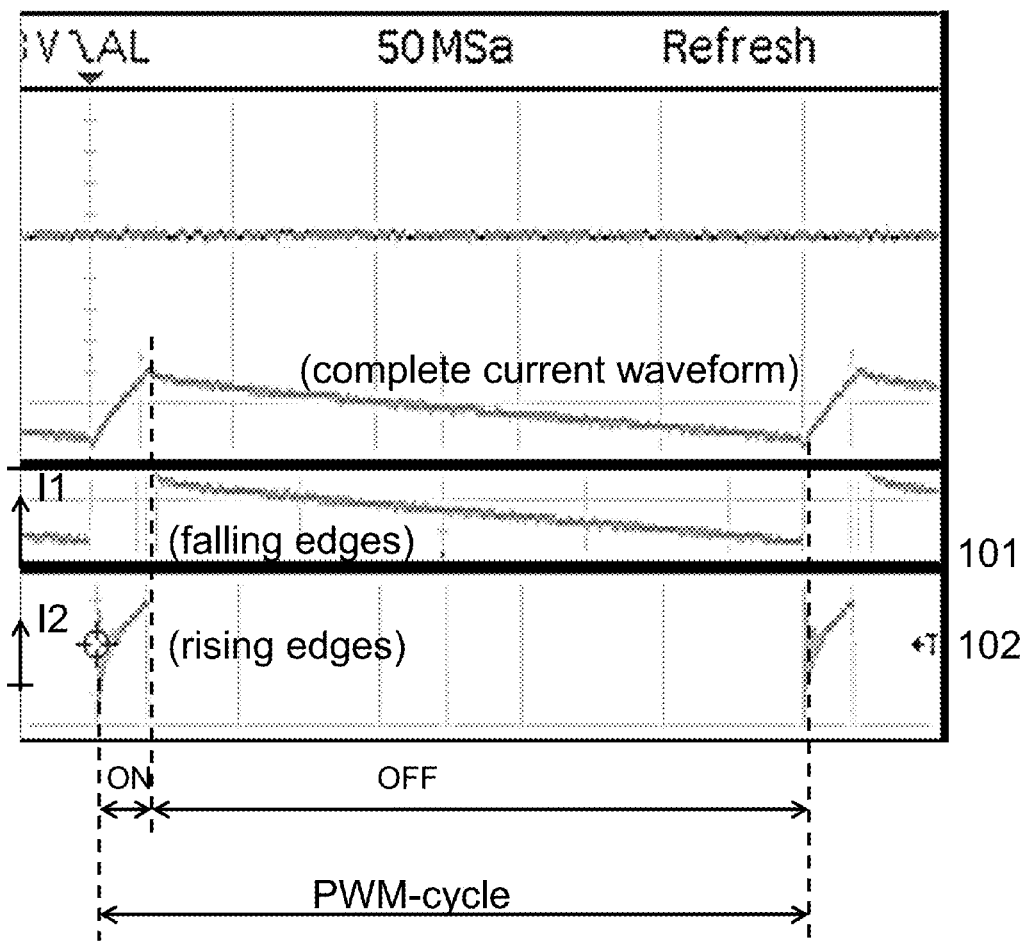
FIG. 1 shows current sensed in a low-side (LS) current sensor and in a high-side (HS) current sensor, for one active phase in one PWM period, as can be measured in a circuit such as that of FIG. 2.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "high-side implementation" (or simply HS), reference is made to a part of the circuit isolated from ground, typically connected to the supply voltage of the circuit or, in embodiments of the present invention, to a sensor connected to the supply voltage of the circuit. Analogously, "low-side implementation" or LS refers to a part of the circuit isolated from the supply voltage, normally grounded or, alternatively, connected to a grounded sensor, according to embodiments of the present invention.

In the present document, the terms "coil" and "phase" and "winding" are used as synonyms.

In the present document, the terms "flyback diode" and "freewheeling diode" are used as synonyms.

Where in the present invention reference is made to "phase overlapping at macro-level (or at macro-scale)", what is meant is that two different coils are being driven simultaneously at macro-scale. See for example FIG. 22, where two trapezoidal waveforms are "overlapping" in time (indicated by rectangle). (for completeness: this does not necessarily mean that the two windings are being energized at the same time at "micro-level", as will become clear further).

In the present document, with "at micro-level" is meant a time-window smaller than a PWM-period, and with "macro-level" is meant a time-window comprising several (for example at least 20) PWM periods.

Where in the present invention reference is made to "no phase overlapping at macro-level (or at macro-scale)", what is meant is that two different coils are not being driven simultaneously at macro-scale. See for example FIG. 21, where the current in a first coil is actively controlled during a first period P1, and the current of a second coil is actively controlled in a second period P2 not overlapping with the first period P1.

Where in the present invention reference is made to "phase overlapping at micro-level" (or at micro-scale), what is meant is that two coils are simultaneously being energized during a fraction of a PWM-period. In the context of the present invention this means that the two HS-switches and the two LS-switches of two coils (hence 4 transistors) are simultaneously closed (see further, in particular mode 16 in Table 1).

In a first aspect, the present invention relates to a circuit for controlling a multiphase motor having at least two phases, or having at least three phases. Embodiments of the present invention may be applied to brushless motors having at least two, or at least three phase windings, for instance in a SRM (Switched Reluctance Motor).

The circuit according to embodiments of the present invention may comprise integrated circuits, and it may be implemented on a printed circuit board (PCB).

Embodiments of the present invention comprise only one, or only two current sensors. It is an advantage of embodiments of the present invention that the implementation in the circuit can be simple and compact.

In embodiments of the present invention where two sensors are present, both sensors may be used, or only one sensor may be used.

The current sensors may be any type of current sensor. For instance, current sensors may comprise shunt resistors with or without amplification or a combination of different sensor types, the present invention not being limited by any particular sensor. For instance, high performance sensors may be used in certain applications. In case shunt resistors are used as current sensors, current sensing is performed via voltage measurement across the shunt resistor, for instance an ammeter shunt. This way, complex circuitry is avoided, thus minimizing losses. A circuit arrangement with only two shunt resistors is advantageously simple and compact, compared to other sensor implementations like current sensing transformers, and even more so a circuit arrangement with only a single shunt resistor.

It is an advantage of embodiments of the present invention that both sensors (when two sensors are present) are isolated from each other, thus avoiding common modes and hence reducing number of components such as amplifiers, filters, etc. Hence, PCB area may advantageously be reduced.

Figure 21:
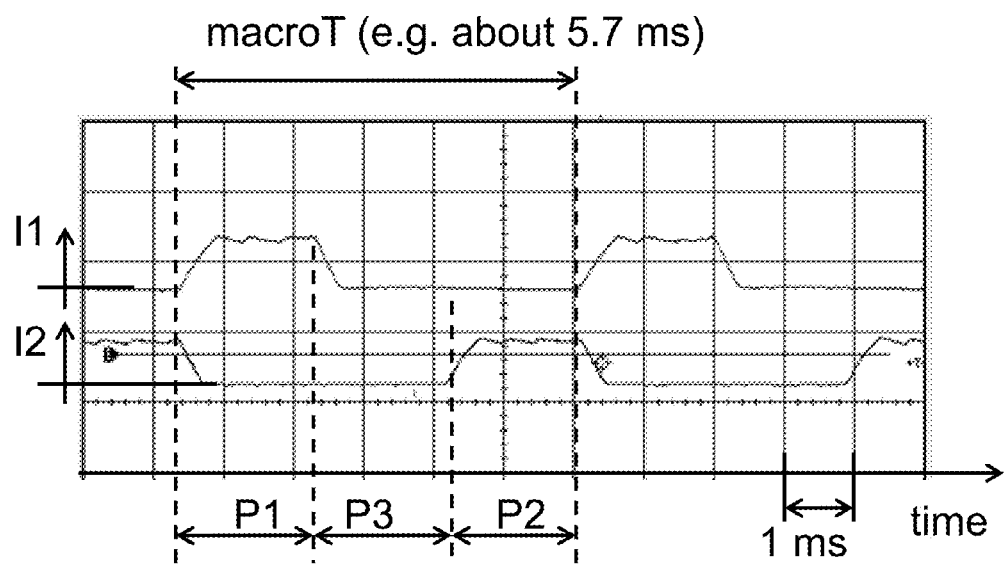
FIG. 21 shows an example of measured waveforms of a three-phase motor where two windings are being driven with trapezoidal waveforms in a non-overlapping mode (at macro level). (the current through the third winding is not shown). In this case the PWM schemes of FIG. 16 to FIG. 20 are not used, since in this case, the coils are not driven simultaneously (at macro scale and at micro-scale).

Before explaining the actual invention, FIG. 21 shows a known manner of driving a motor, by energizing one phase at the time. In the example shown, the current waveforms are trapezoidal, but that is not absolutely necessary for the present invention, and other waveforms may be generated as well, for example sinusoidal or block waveforms or triangular waveforms, etc. It is well known that such waveforms can be generated (or approximated) by using a PWM-signal, whereby the duty cycle is controlled over time such that the resulting phase current corresponds to a predefined or desired value (e.g. the value of the ideal waveform). The effect of a PWM-signal on the current through a phase winding is well known in the art, and need not be described in detail here.

FIG. 1 shows an example of a current 102 sensed in a LS current sensor (for example as measured by the sensor 202 of FIG. 2, at a moment when the coil 204 is being energized), and the current 101 sensed in an HS current sensor (for example as measured by the sensor 201 of FIG. 2, at a moment when the coil 204 is freewheeling via its HS transistor and HS diode), for one active phase in one PWM period of e.g. 50 microseconds (this is an exemplary value used in a particular case, the present invention not being limited thereto). The rising part of the current 102 corresponds to a configuration in which both the high-side and low-side switches (e.g. transistor) are turned ON (e.g. transistor 210 and 213 of FIG. 2). The time interval of the falling current in 101 corresponds e.g. to a configuration in which the HS switch (e.g. transistor) is turned ON and the LS switch (e.g. transistor) is turned OFF, providing the upper freewheeling mode. In such a configuration, the LS sensor 202 senses the rising edge of the current waveform through the winding, while the HS sensor 201 measures the falling edge of the phase current. This example is merely intended to demonstrate that the current (albeit a rising portion thereof or a falling portion thereof) can be measured by means of a current sensor arranged in the HS or in the LS path. As the current through a motor coil only changes gradually over time, both measurements, or only one of these measurements can be considered as a measurement (or sample) of "the" current through the coil.

Figure 22:
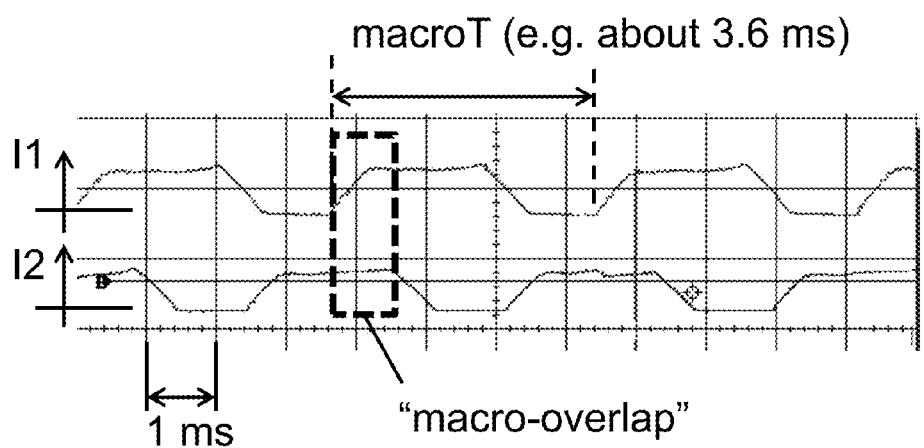
FIG. 22 shows a measurement waveform of the current in a first and second winding, when the motor is driven in a trapezoidal manner with phase-overlap (at macro level), meaning that at some moments in time, current is flowing in both the first and the second winding. In the zone indicated by "macro-overlap", all the PWM schemes of FIG. 16 to FIG. 20 can be used at micro-level to make sure that each of the first and second current follow the trapezoidal waveforms, which is achieved by measuring both currents, and by appropriately increasing/decreasing the first and second current.

However, the above may not work anymore when two coils are being driven "simultaneously" as illustrated in FIG. 22, which is referred to herein as "macro-overlapping" mode, because the sum of the currents would be measured, not the individual currents through each coil. Advantages of the present invention will become apparent especially for this mode.

In embodiments of the present invention, each winding is associated with a couple of switches (e.g. transistors) and a couple of freewheeling diodes (also known as flyback diodes).

Where in embodiments of the present invention reference is made to an "asymmetric half bridge", reference is made to one branch of a motor driving circuit, the branch comprising a winding (or coil) connected to the control switches and the freewheeling diodes.

Figure 2:
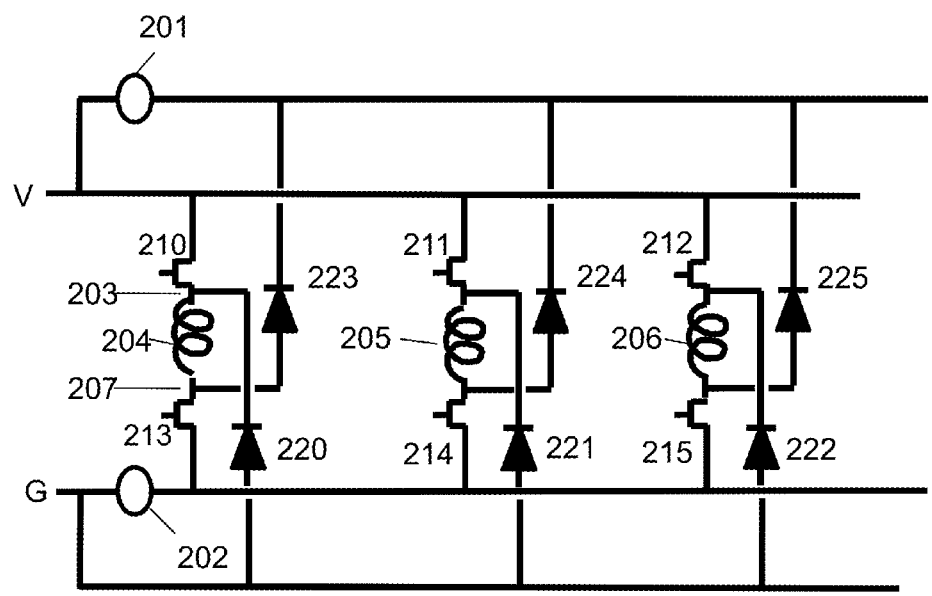
FIG. 2 schematically shows a driving circuit for a reluctance motor having three motor windings, comprising two sensors according to embodiments of the present invention.
Figure 2:
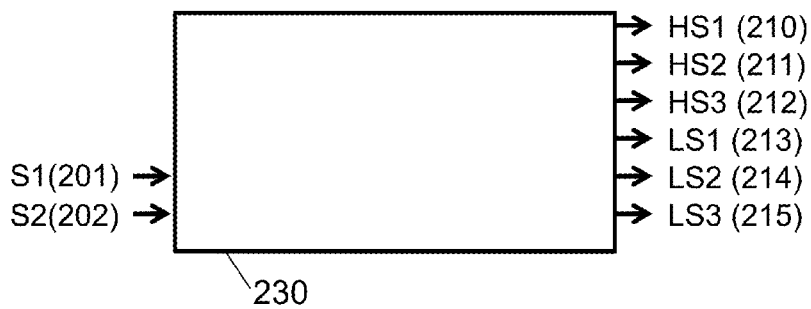

FIG. 2 shows a circuit 200 for controlling a multiphase motor with three windings, according to embodiments of the present invention. The driving circuit 200 has a first current sensor 201 in high-side (HS) implementation, hence connected to the supply voltage V, while it has a second current sensor 202 in low-side (LS) implementation, hence connected to ground G. All elements directly connected to the supply voltage V or to the HS current sensor are said to be HS elements; analogously, all elements directly connected to the LS current sensor or to ground G are said to be LS elements. In case of the elements shown in FIG. 2, a first terminal 203 of each winding 204, 205, 206 is directly connected to an HS transistor 210, 211, 212 (for example to the source of a MOSFET transistor) and to an LS freewheeling diode 220, 221, 222 (in particular to the cathode of said diode), and a second connection 207 of each winding 204, 205, 206 is directly connected to an LS transistor 213, 214, 215 (for example to the drain of a MOSFET transistor) and to an HS freewheeling diode 223, 224, 225 (in particular to the anodes of said diodes). In the particular embodiment shown in FIG. 2, the second current sensor, LS current sensor 202, is directly connected to the common connection (in FIG. 2: the source) of the LS transistors 213, 214, 215, while the common electrode (in the figure, the anode) of the LS diodes 220, 221, 222 is grounded. On the high side, the first current sensor, HS current sensor 201, is shown directly connected to the common electrode (in the figure, cathode) of the HS diodes 223, 224, 225, while the common connection (in the figure: drain) of the HS transistors 210, 211, 212 is directly connected to the supply voltage V.

As will become clear further, the present invention is not merely related to the fact of providing a drive circuit with two current sensors, one in the high-side and one in the low-side, but to the fact that a single current sensor is sufficient to measure the currents through two coils, even in macro-overlapping mode (see FIG. 22), whereby two coils are actively driven "simultaneously" (at macro scale). This is accomplished by using particular schemes of driving the transistors, in combination with a single current sensor (see FIG. 12 to FIG. 15), or in combination with two current sensors (see FIG. 3 and FIG. 4).

For completeness it is noted that embodiments of the present invention may still comprise two current sensors, for example, one arranged in the high-side, and one arranged in the low-side, even though a single current sensor is sufficient. In this case, one current sensor is redundant, but the values of the two sensors can be used for example for averaging the reading (e.g. for increasing accuracy), or can be used for fault detection, ageing detection and the like. When used in this way, the robustness and reliability of the circuit can be increased.

In the following, the term "connected" is analogous to "directly connected".

Several possibilities are included in embodiments of the present invention. For example, the type of switch and configuration may be chosen according to specific applications. In the particular example shown in FIG. 3, a driver circuit 300 comprises metal-oxide-semiconductor field effect transistors (MOSFETs) 310, 311, 313, 314. Those MOSFET in HS implementation 310, 311 are shown with common drain connected to supply voltage V, and source connected to the first connection 303 of windings 304, 305 as well as to the cathode of the LS diode 320, 321. These LS diodes 320, 321 are, in turn, shown connected to ground. On the other hand, those MOSFET in LS implementation 313, 314 are shown with the drain connected to the windings 304, 305 and their common source connected to the LS sensor 302, as well as the drain connected to the anode of the HS diode 323, 324, whose common cathode is connected to the HS sensor 301. A block-diagram of a control circuit 330 for driving the transistors and for measuring the sensors according to a method of the present invention is also shown.

Figure 4:
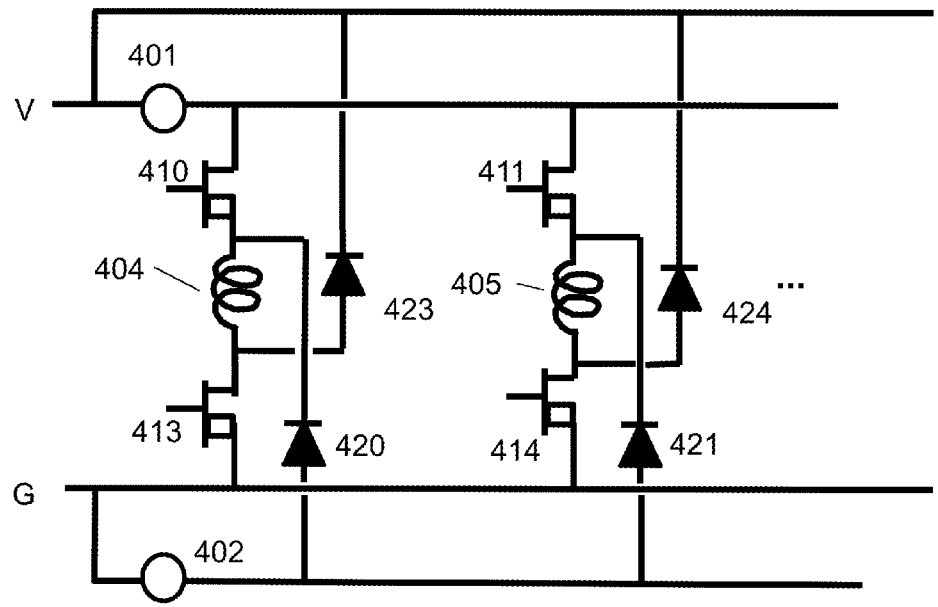
FIG. 4 shows a variant of FIG. 3, having a different configuration, according to an embodiment of the present invention.
Figure 4:
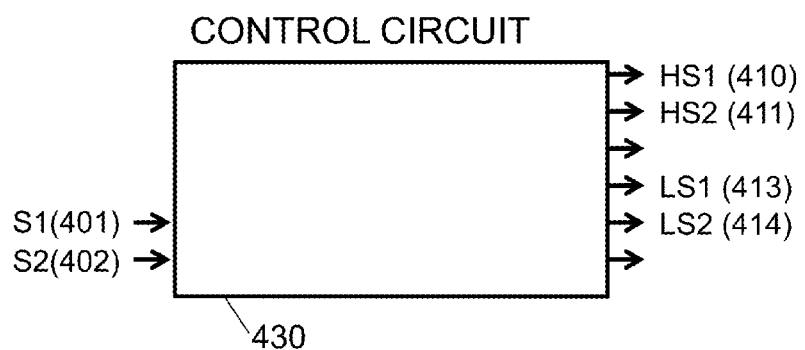

In an equivalent embodiment 400, shown in FIG. 4, two of the asymmetric half bridges in a driving circuit are shown, their HS transistors 410, 411 connected to the HS sensor 401: the HS sensor 401 is shown connected to the common drain of the HS MOSFETs 410, 411 only, instead of to the common cathode of the HS diodes 423, 424 only, which is connected to the supply voltage. The LS sensor 402 is shown connected to the common anode of the LS diodes 420, 421 only, and the common source of the LS MOSFETs 413, 414 is shown grounded. A block-diagram of a control circuit 430 for driving the transistors and for measuring the sensors according to a method of the present invention is also shown.

Other implementations, with different type of diodes or different type of transistors (switches), are also possible. The choice of type of switch and diode depends on the application. For example, Power MOSFETS may be used. For instance, instead of MOSFET, IGBT may be used. For example, a set of bipolar junction transistors (BJT) may also be used, instead of MOSFET. In cases in which npn BJT are used, the common source is substituted by common emitter, for example, adapting the rest of the circuit accordingly. Analogously, instead of regular diodes, Schottky-diodes may be used; or a combination thereof. This substitution may be done in cases in which a lower voltage drop is desirable, for example.

The present invention is also applicable in cases in which negative supply voltage is used instead of grounding. It may be applicable also to other groundings, like chassis grounding. The discussion and result would be equivalent.

Figure 3:
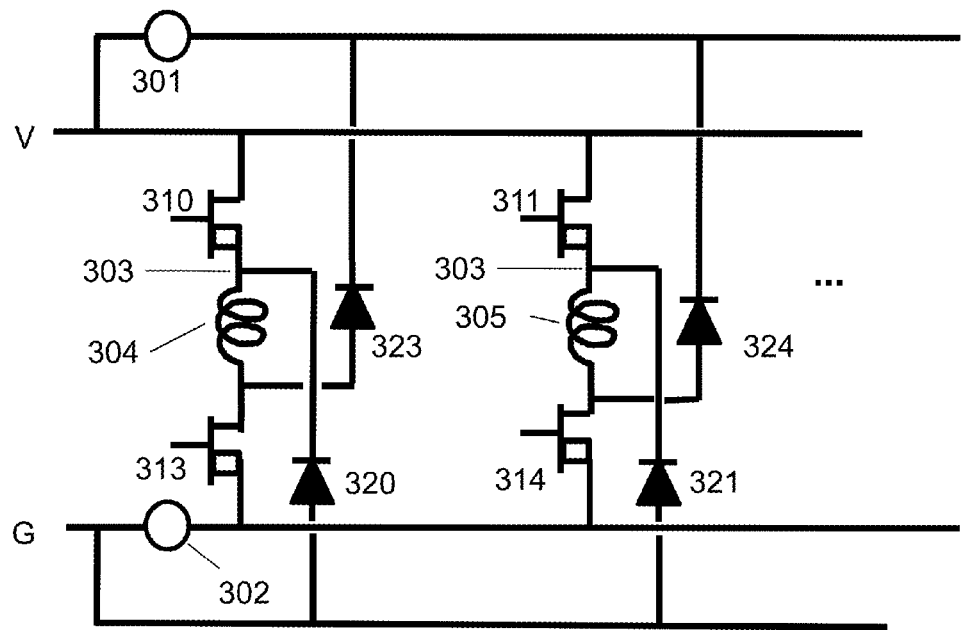
FIG. 3 schematically shows a part of the driving circuit of FIG. 2, comprising two of the windings and MOSFETs. In addition an example of a possible control circuit for driving the transistors, and for reading the sensors is also shown.
Figure 3:
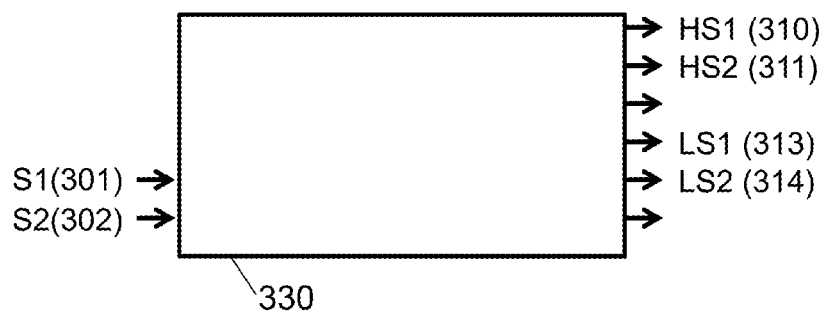

In FIG. 3 and FIG. 4 two circuit topologies were shown having two current sensors, one arranged in HS implementation, the other arranged in LS implementation. FIG. 12 to FIG. 15 will illustrate four other circuit topologies having only a single current sensor.

Figure 12:
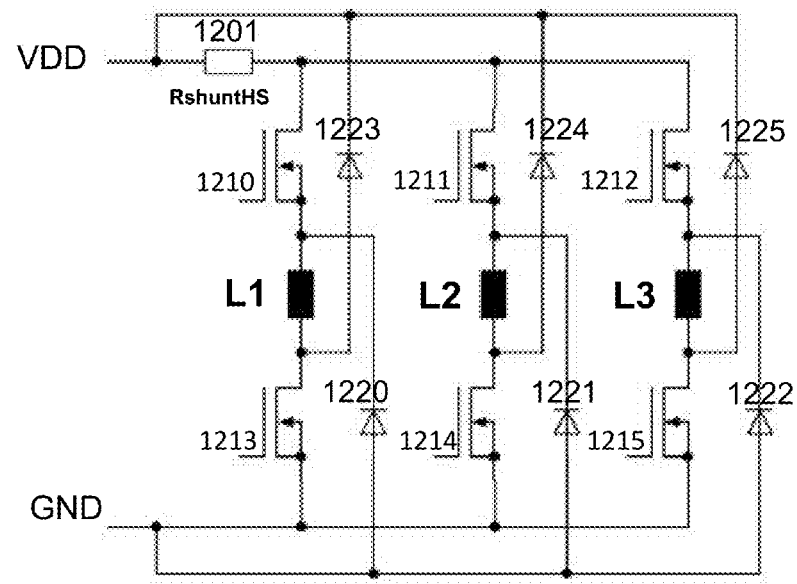
FIG. 12 shows a first specific example of a circuit according to an embodiment of the present invention, where a single current sensor is arranged in the high-side, with one terminal connected to the power supply, and its other terminal connected to the drain of the high-side transistors of each winding. An example of a control circuit for driving said transistors and for measuring said current sensor is also shown.
Figure 12:
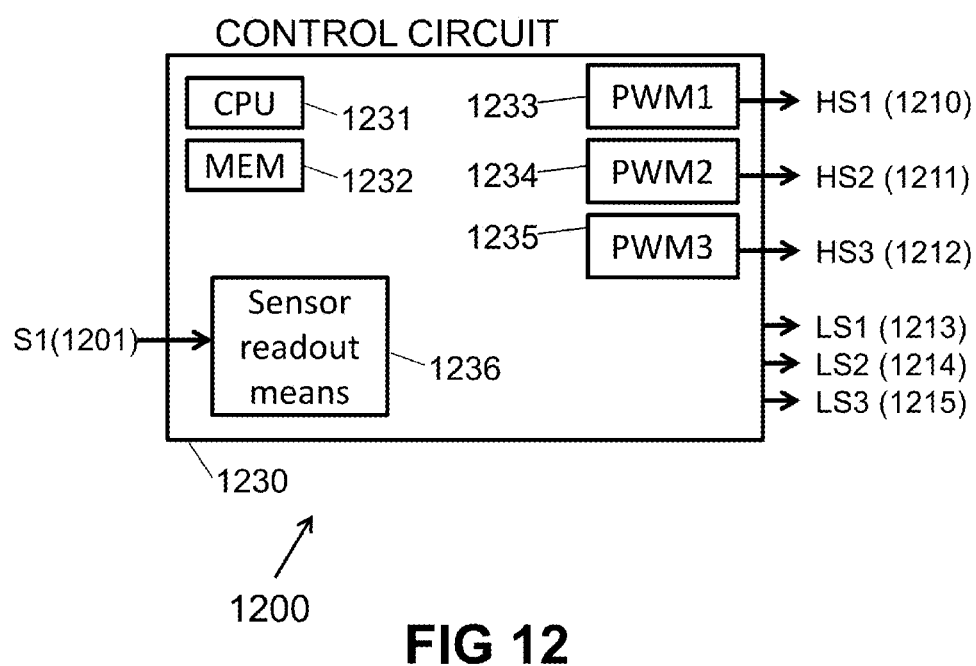

FIG. 12 shows an embodiment of a circuit for driving a motor with three coils L1, L2, L3, each coil having a HS-transistor, LS-transistor, HS-diode and LS-diode. The circuit further comprising a controller 1230 for driving the six transistors, and means 1236 for obtaining a current value from the single current sensor 1201 arranged in the high-side, between the voltage supply line and the drain of the HS-transistors. This circuit very much resembles that of FIG. 3, except that it only has a single current sensor 1201, whereas the circuit of FIG. 3 has two current sensors 301, 302. As will be explained further, it is possible to measure the currents through all the coils L1, L2, L3, using only the single current sensor 1201, even when the motor is driven in "overlapping mode" (at macro level), by making use of particularly selected driving schemes.

Figure 13:
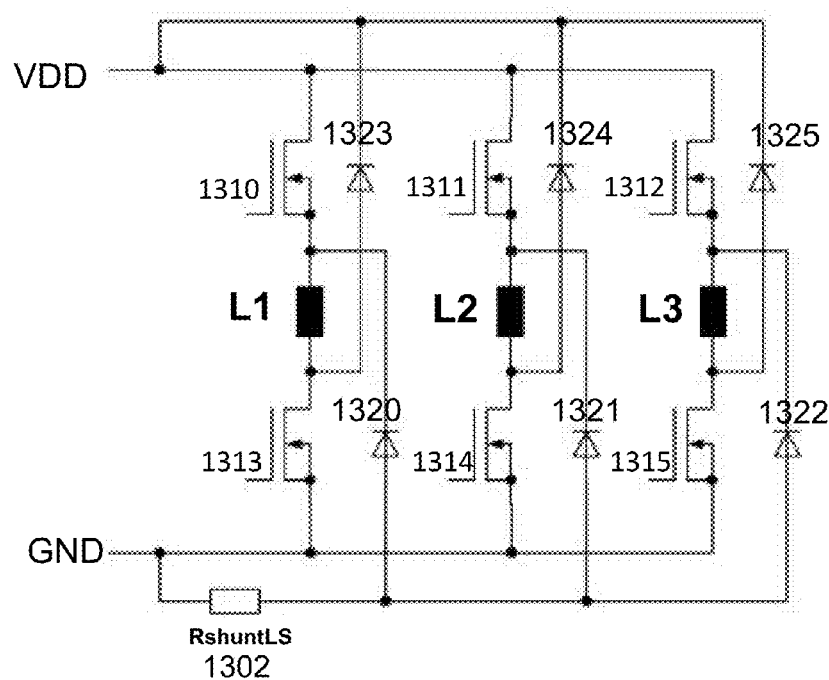
FIG. 13 shows a second specific example of a circuit according to an embodiment of the present invention, where a single current sensor is arranged in the low-side, with one terminal connected to ground, and its other terminal connected to the anodes of the low-side diodes of each winding. An example of a control circuit for driving said transistors and for measuring said current sensor is also shown.
Figure 13:
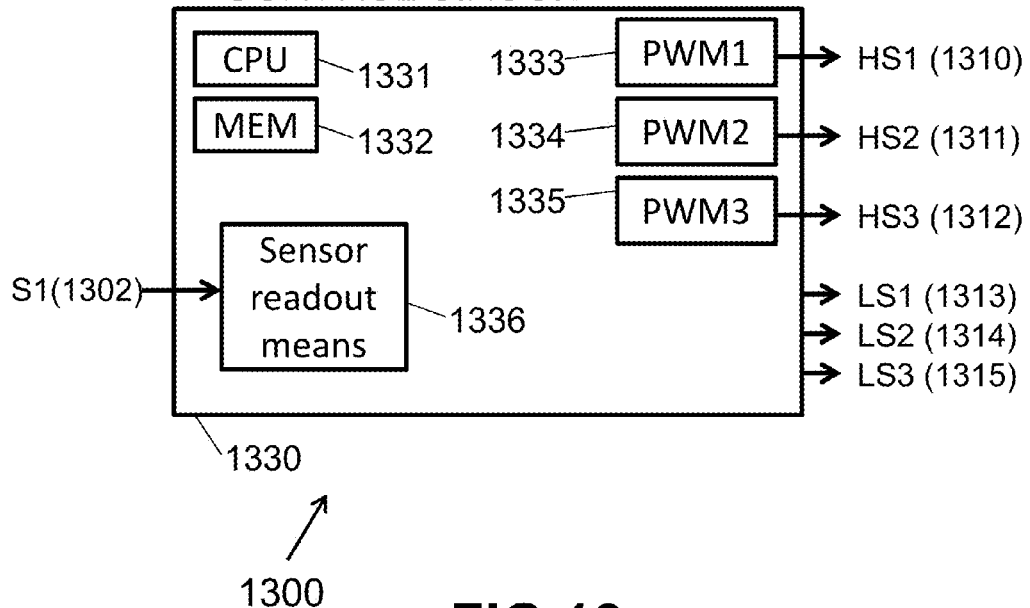

FIG. 13 shows a variant of the circuit of FIG. 12, containing a single current sensor 1302, but arranged at the low-side, with one of its terminals connected to ground and its other terminal connected to the anodes of the LS-diodes 1320, 1321, 1322. This circuit functions in much the same way as that of FIG. 12, and offers the same advantages.

Figure 14:
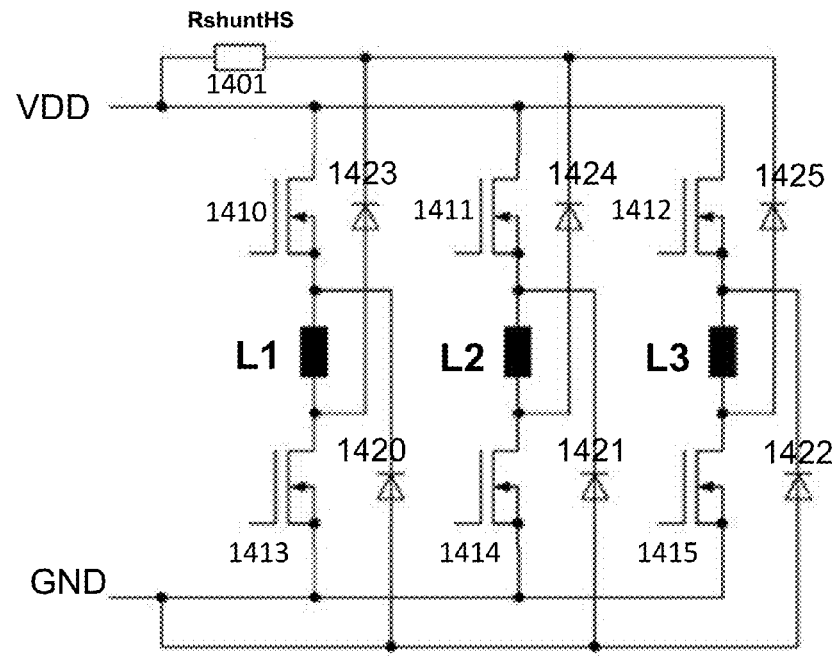
FIG. 14 shows a third specific example of a circuit according to an embodiment of the present invention, where a single current sensor is arranged in the high-side, with one terminal connected to the power supply and its other terminal connected to the cathodes of the high-side diodes of each winding. An example of a control circuit for driving said transistors and for measuring said current sensor is also shown.
Figure 14:
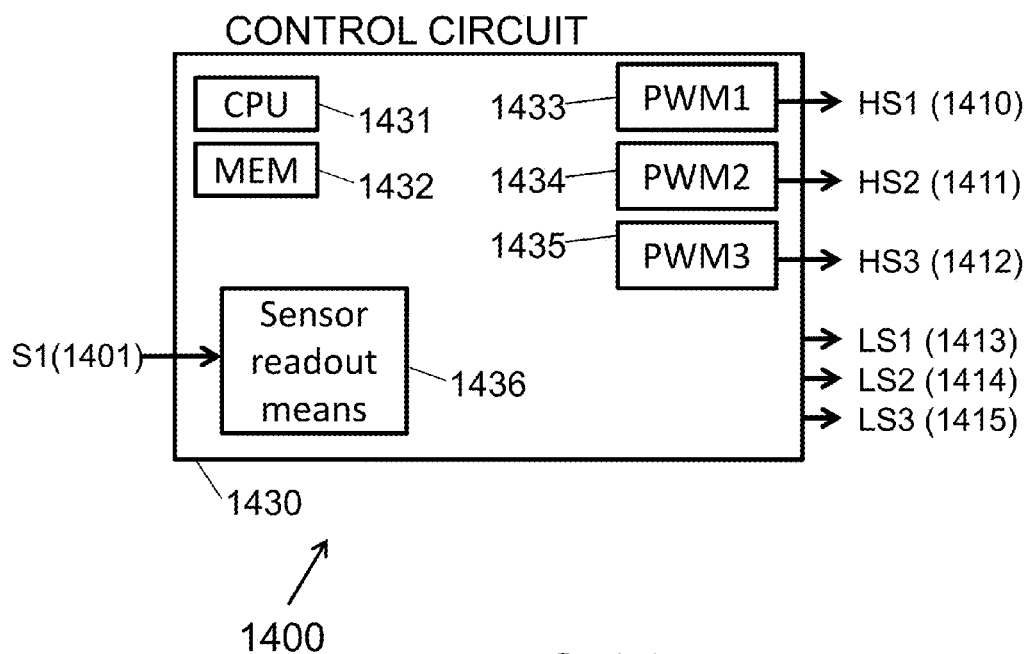

FIG. 14 shows another variant of the circuit of FIG. 12, containing a single current sensor 1401, arranged at the high-side, with one of its terminals connected to the supply-voltage and its other terminal connected to the cathodes of the HS-diodes 1423, 1424, 1425. This circuit functions in much the same way as that of FIG. 12, and offers the same advantages.

Figure 15:
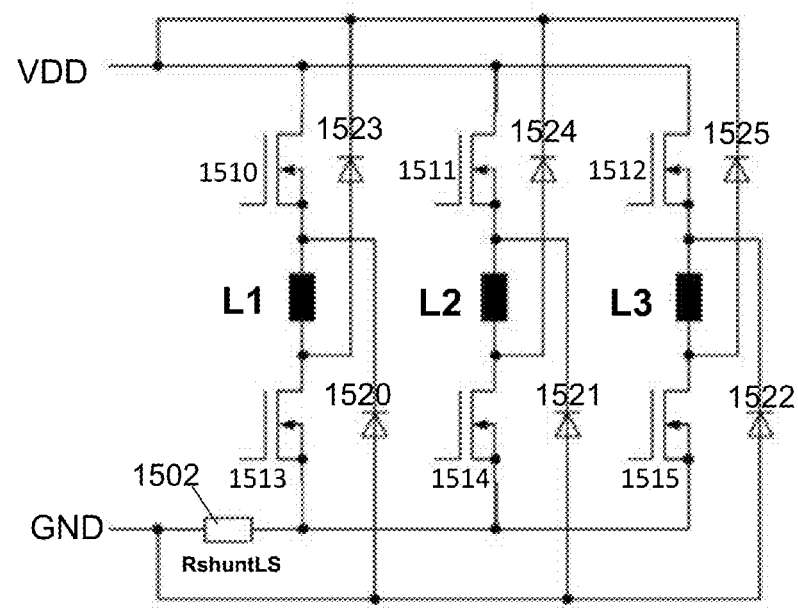
FIG. 15 shows a fourth specific example of a circuit according to an embodiment of the present invention, where a single current sensor is arranged in the low-side, with one terminal connected to ground and its other terminal connected to the source of the low-side transistors of each winding. An example of a control circuit for driving said transistors and for measuring said current sensor is also shown.
Figure 15:
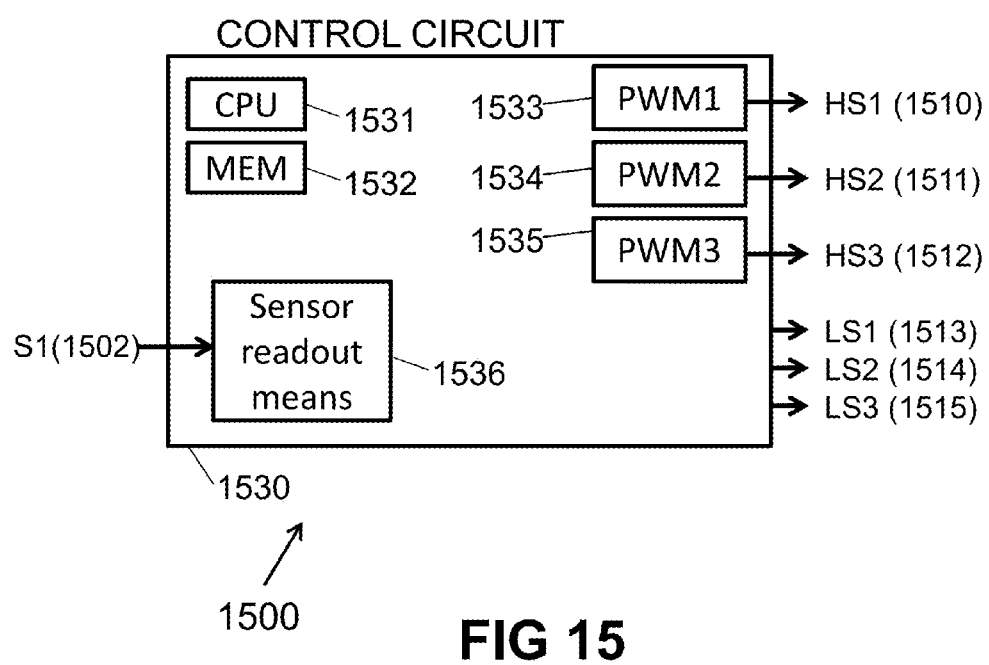

FIG. 15 shows another variant of the circuit of FIG. 12, containing a single current sensor 1502, arranged at the low-side, with one of its terminals connected to ground and its other terminal connected to the source of the LS transistors 1513, 1514, 1515. This circuit functions in much the same way as that of FIG. 12, and offers the same advantages.

The exemplary controllers 1230, 1330, 1430, 1530 shown in FIG. 12 to FIG. 15 have a programmable processor CPU 1231, 1331, 1431, 1531 and a memory 1232, 1332, 1432, 1542, which may comprise a volatile memory (e.g. RAM, SRAM, DRAM) and/or a non-volatile memory (e.g. Flash). The non-volatile memory may comprise a computer program comprising instructions to be executed by the CPU for performing a method according to the present invention. The controller shown in FIG. 12 to FIG. 15 further comprise three PWM-modules PWM1, PWM2, PWM3 for generating three PWM-signals HS1, HS2, HS3 for the HS-transistors. Preferably the PWM-controllers are configurable to selectively left-align or right-align the PWM-signal for reasons to be explained further. The controller also generates three signals LS1, LS2, LS3 for the three low-side transistors, which signals may be implemented via GPIO-pins (general purpose Input/Output pins), but three additional PWM-modules (not shown) may also be used. In an alternative embodiment, the control circuit would not have any PWM-modules, but all signals would be applied via GPIO-pins. Such an implementation would work, but is not preferred however, because it is more complex to implement, and requires more processing power.

The functioning of these circuits, in particular how the current in a first coil can be driven to follow a first waveform, and how the current in a second coil can be driven to follow a second waveform, and how the current of the first and of the second coil can be measured in each PWM period, will be explained in more detail below.

In a second aspect, the present invention also relates to a method for driving a multiphase motor having at least two windings, or at least three windings, or more than three windings. More particularly, the method is particularly related to driving two of the phase windings in overlapping mode at macro-level (see FIG. 22), and for measuring the individual currents flowing through these two windings.

Although the principles of the present invention work for motors having only 2 windings, or having 3 windings, or having more than 3 windings, the present invention will be further described for a motor having three windings, whereby winding 1 and winding 2 are energized while winding 3 is not energized, but the same principles are also applicable when (some time later) winding2 and winding3 are energized, while winding1 is not energized, and also when (some time later) winding 1 and winding 3 are energized, while winding 2 is not energized. Likewise, for an N-phase motor, the same principles can be applied to each pair of windings "simultaneously" being energized (at macro level).

Before describing the schemes presented by the present invention, some working principles of parts of the circuit of FIG. 2 to FIG. 4 will be explained with reference to FIG. 5 to FIG. 8. In these figures, the switches are shown as ideal switches, and one of the windings is shown with its corresponding HS and LS transistor and corresponding HS and LS diode.

Since there are two transistors for each winding, each being configurable in one of two states: ON (i.e. switch closed) or OFF (i.e. switch open), there are 4 possible configurations for each winding:

When the HS transistor is ON and the LS transistor is OFF (see FIG. 5), the winding is said to be "freewheeling by its HS switch" or "freewheeling via its HS diode". In this condition, the current in the winding will slowly decrease (see for example falling part of the waveform in FIG. 1).

When both the HS and the LS transistor are ON (see FIG. 6), the winding is said to be "energized" or "driven". In this condition, the current in the winding will strongly increase (see for example rising part of the waveform in FIG. 1).

When the HS transistor is OFF and the LS transistor is OFF (see FIG. 7), the winding is said to be "inverted". In this condition, the current in the winding will strongly decrease (not shown).

When the HS transistor is OFF and the LS transistor is ON (see FIG. 8), the winding is said to be "freewheeling by its LS switch" or "freewheeling via its LS diode". In this condition, the current in the winding will slowly decrease (see for example falling part of the waveform in FIG. 1).

Figure 5:
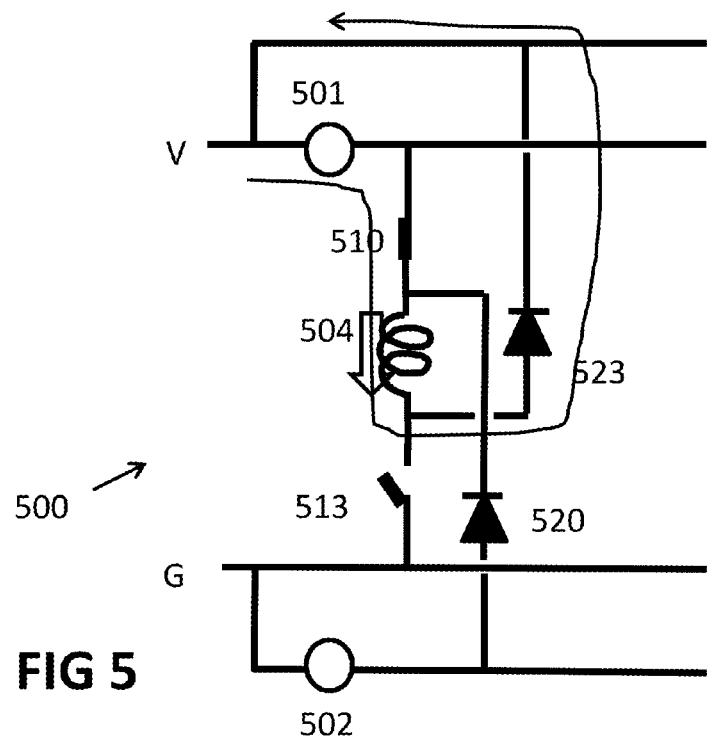
FIG. 5 shows an idealized asymmetric half bridge in freewheeling mode through the high-side diode by HS switch (and HS-diode).
Figure 8:
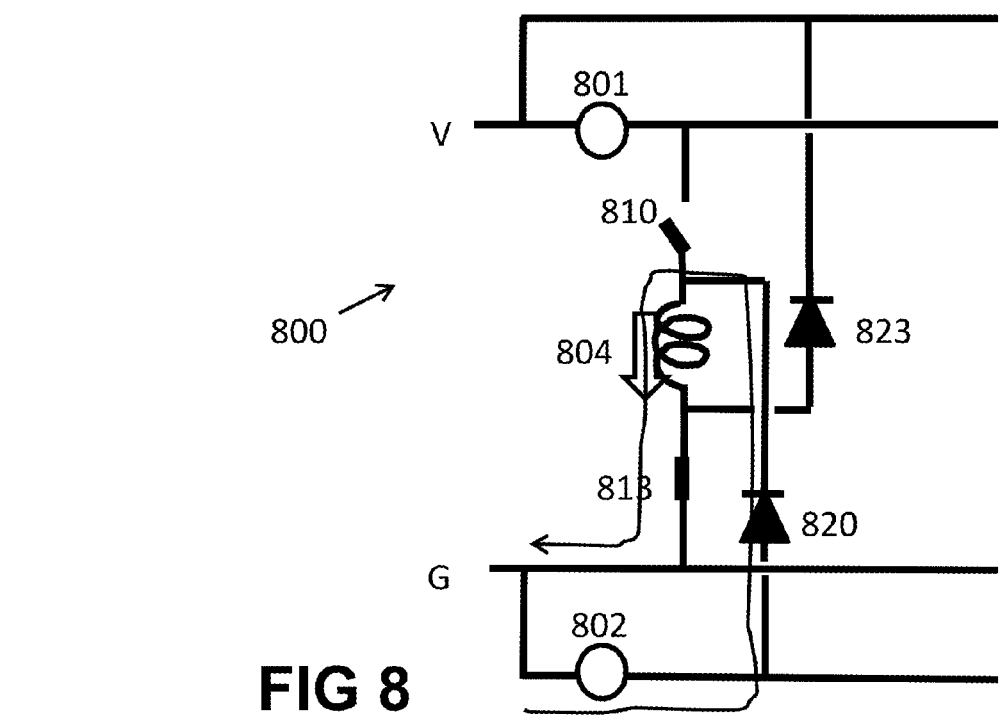
FIG. 8 shows an idealized asymmetric half bridge in freewheeling mode through the low-side diode by LS switch (and LS-diode) (mode complementary to the mode shown in FIG. 5).

Preferably, but not necessarily, all other windings of the motor (if the motor has more than 2 windings), except the two windings being "driven" (at macro-level, see FIG. 22), are configured in one of the two freewheeling modes of FIG. 5 or FIG. 8).

The state of the windings shown in FIG. 5, FIG. 6, FIG. 7 and FIG. 8 are referred to as: freewheeling by HS switch, powering, inverting, and freewheeling by LS switch respectively.

Explaining FIG. 5 to FIG. 8 in some more detail,

One of two freewheeling modes is shown as an idealized circuit 500 in FIG. 5, in which switches are represented as ideal switches 510, 513. Herein, one switch 510 connected to the winding is ON (switch is closed) and the other switch 513 is OFF (switch is open). A connection to V is made through one of the freewheeling diodes (in this case, 523) but the winding 504 is not energized. The sensor 501 may receive input from the freewheeling winding 504. The sensor 502 cannot sense the current I1 flowing through coil 1.

Figure 6:
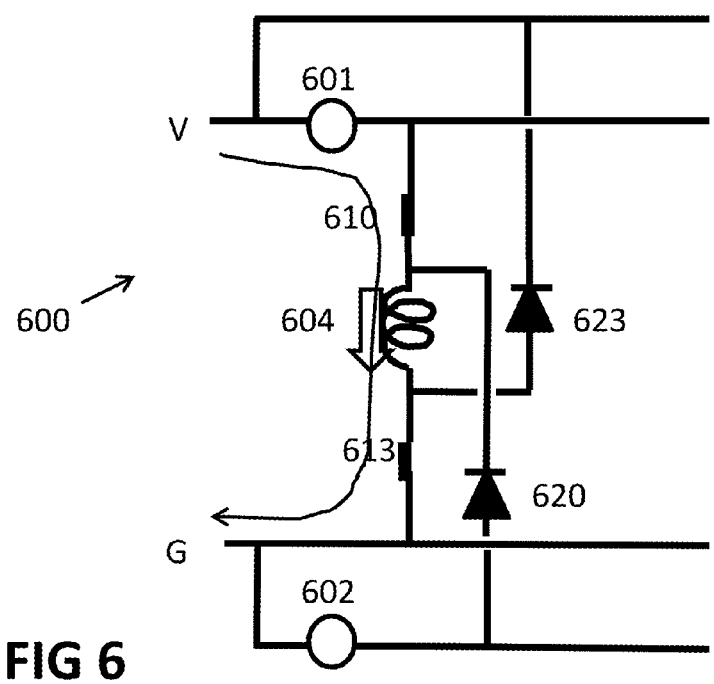
FIG. 6 shows an idealized asymmetric half bridge in powering mode.

A second mode is obtained by a configuration 600 as is shown in FIG. 6. In this case, the winding 604 is powered (also referred to as "driven" or "energized"), if both switches 610, 613 of the corresponding winding are ON (switches closed). Then, the current passes through one of the sensors (in this case the HS current sensor 601) and through the winding 604, which is connected in direct mode to the DC voltage between the supply line V and the ground G. The sensor 602 cannot sense the current I1 flowing through coil 1.

Figure 7:
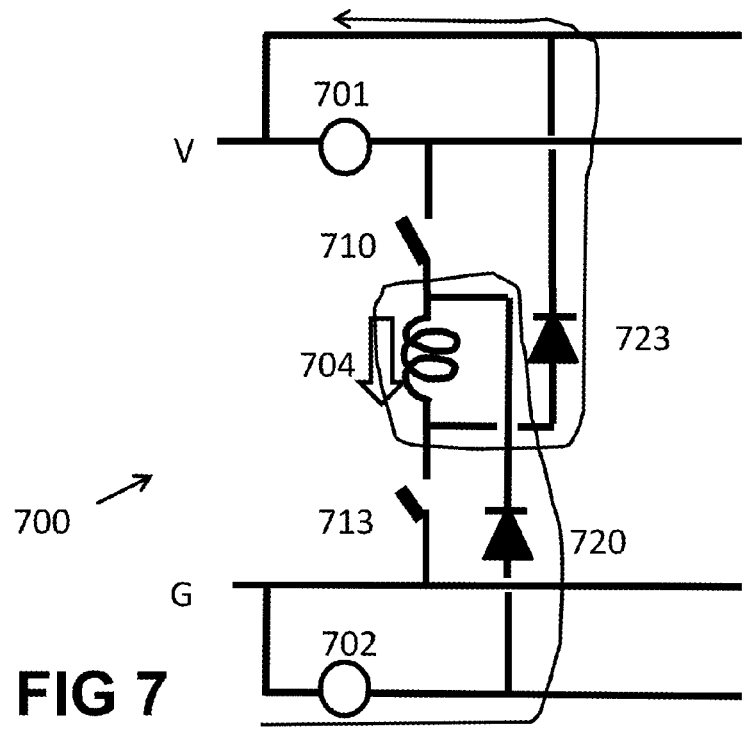
FIG. 7 shows an idealized asymmetric half bridge in inverting mode.

A further mode is shown in FIG. 7. The configuration 700 comprises inverting the winding 704, if both switches 710, 713 of the corresponding winding are OFF (switches open), the current passes through both freewheeling diodes 723, 720, through the winding 704 and through one of the sensors (in this case, through LS sensor 702) which according to embodiments of the present invention are inverted with respect of the supply voltage. Hence, current is inverted with respect to the powering step, and power is transferred from the winding to the circuit. This mode can be utilized for instance to set the current through the winding to zero during regular motor operation, or for braking the motor, among other applications. The sensor 701 cannot sense this current.

A further mode is shown in FIG. 8 as an idealized circuit 800, in which the switch configuration is the complementary of circuit 500 in FIG. 5. The present circuit configuration 800, one ideal switch 810 connected to the winding is OFF (switch is opened) and the other switch 813 is ON (switch is closed). A connection is made through one of the freewheeling diodes (in this case, 820) but the winding 804 is not energized. The sensor 802 can sense the current from the freewheeling winding 804, the sensor 801 cannot.

Figure 9:
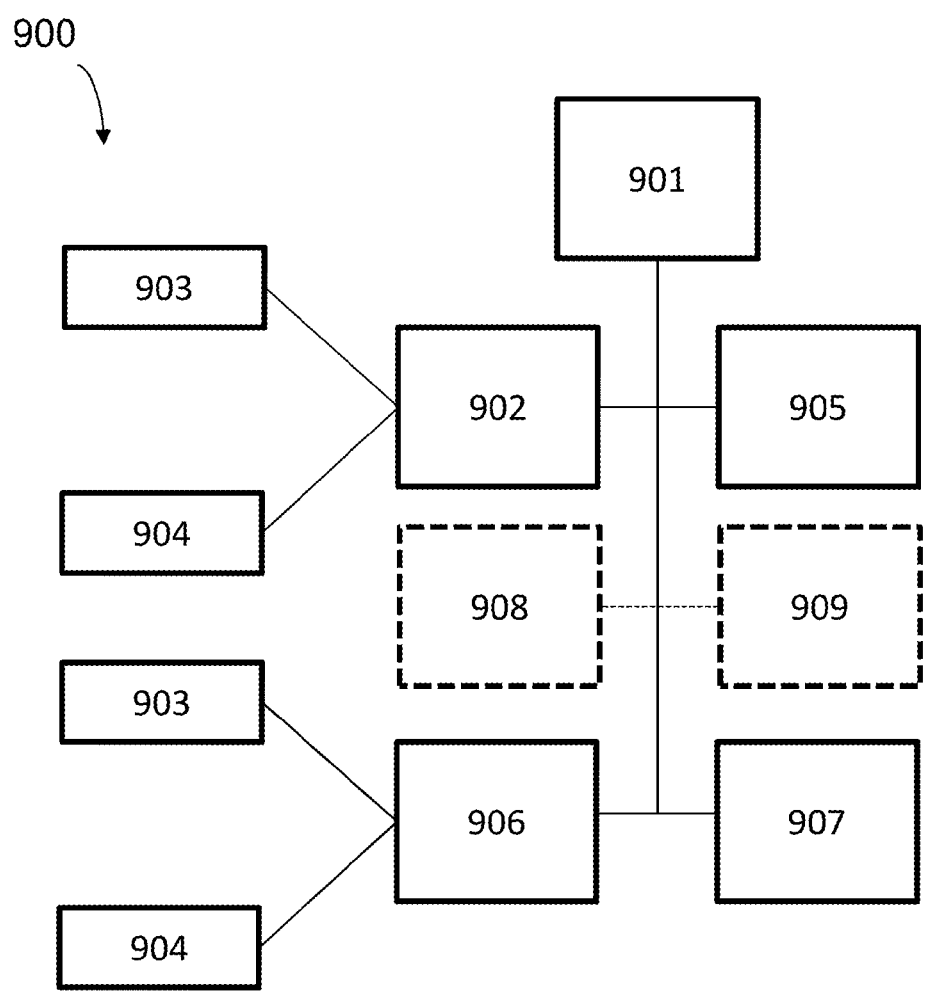
FIG. 9 shows a flowchart diagram illustrating a method according to embodiments of the present invention.

FIG. 9 shows a flowchart 900 illustrating the main steps of a method according to embodiments of the present invention.

Start Phase 901

First, driving 902 one of the windings by an appropriate polarization of the switches in the same branch as that winding. Driving 902 may compromise powering 903 the winding (hence powering the motor), or inverting 904 the winding (hence braking the motor).

Second, sensing 905 the current flowing through both current sensors 201, 202. The combination of output signals of the current sensors 201, 202 will depend on the type of driving of the windings, and there is no need to include an independent control of the sensors.

Third, driving 906 at least a second winding (different from the first winding) by an appropriate polarization of the switches in the same branch as the at least a second winding, analogously to the first step. Driving at least a second winding may comprise driving the second winding by direct powering 903 or inverting 904.

Fourth, sensing 907 the current through both current sensors.

The current control of the windings can be changed following different schemes. For instance, if both transistors are used for driving the winding, the type of scheme is known as 'hard chopping'. A different valid option would be current control by switching one of the transistors, while keeping the other one ON, using the so-called 'soft chopping'. The present invention may use one, two or both switching types, not being limited thereto.

The steps of driving and sensing for one particular winding may be performed substantially synchronously. For instance, driving windings and current sensing may be synchronous steps. Hence, first and second step may be performed synchronously and third and fourth may also be performed synchronously.

Additionally, first and third steps (driving the different windings) may be performed with or without overlap. For instance, a first winding may be driven by powering, and a second winding may be in a freewheeling mode (not driven). Driving the second winding from freewheeling mode to powering may be performed sequentially after the first winding is driven from powering to freewheeling, in a no-phase overlap mode. Alternatively, the second winding may already be powered before the first winding is switched to freewheeling, in a phase overlap mode. Yet another possibility is powering the second winding a certain amount of time after the first winding is in freewheeling mode. This intermediate optional step 908 in which the first winding is not driven and the second winding is not driven may also comprise a current sensing step 909 using both current sensors. In such case, during said amount of time, all windings may be in freewheeling mode.

Figure 10:
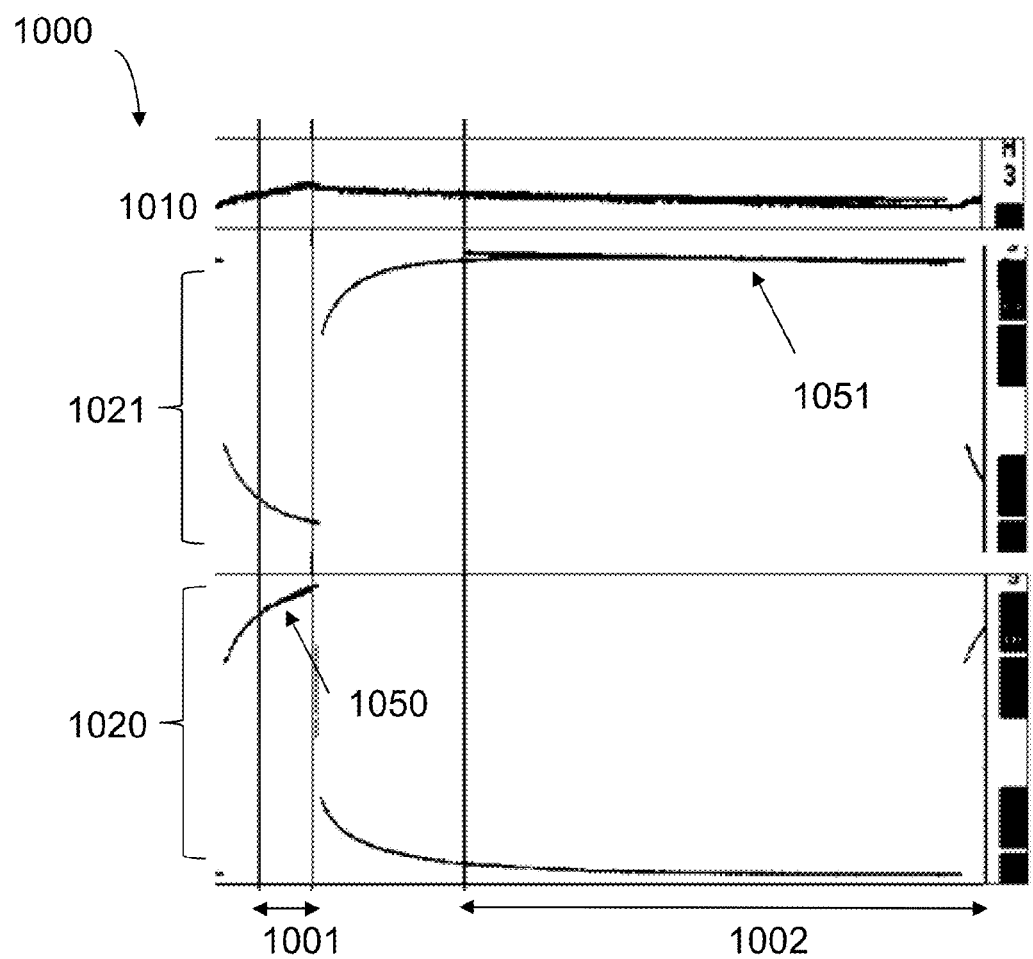
FIG. 10 shows a pulse period (PWM-period) for a motor controlled by PWM and the output of the current sensors, (as can be measured for example in the circuit of FIG. 3 or FIG. 4) according to embodiments of the present invention.

In case the first and third steps do not overlap, the second winding begins to be driven only after the first winding stops being driven (for example, the second winding may be powered by a pulse, and the state of the second winding changes from freewheeling to powering only after the first winding changes its state from powering to freewheeling). It is said in this case that the motor is driven in no-phase overlap mode, via simple switching. Current sensing may be performed, in this case, only in the marked regions 1001 and 1002 of the phase in the simulation 1000 illustrated in FIG. 10, showing the pulse 1010, an exemplary HS sensor output 1020 and an exemplary LS output 1021 of a pulse period. Specifically for this example, the measurement would be done with the HS sensor 1020 in the region 1001 as marked with arrow 1050, and with the LS sensor 1021 in the region 1002 as marked with arrow 1051.

Alternatively, the first and third steps may be performed with a predetermined overlap: the first winding may be driven with a predetermined phase overlap with the second winding. In this case, the motor is driven in phase overlap mode, in which a winding is driven and, before the driving phase changes, at least a second winding is driven. For instance, a winding may be powered during a pulse. Before the pulse ends, a second winding may be powered, for instance also using a pulse. In certain applications this mode may be advantageous. A particular engine may be driven under phase overlap or under no-phase overlap, switching modes according to particular necessities of the moment. Driving the motor in one or another mode depends on the clocking of the switches. Each cycle may contain several PWM zones in which neighboring phases may be powered, in PWM overlap and PWM non-overlap. The current measurement and control, according to embodiments of the present invention, may be applied to each period.

Sensing the current in the second and fourth step may comprise continuously sensing the current with both current sensors, depending on the state ON/OFF of the switches. Advantageously, there is no need of switching between current sensors, and the measuring frequency is substantially the same, preferably the same, as the PWM frequency used to drive the rotor.

Additional features may be envisaged in the present invention, for instance sensing and measuring the back-electromotive force of undriven coils for rotor position determination. However, the present invention advantageously does not need a position encoder to drive the motor, unlike in traditional sensorless motors.

A possible implementation according to embodiments of the present invention is shown in Table 1, showing a logical table, driving modes and expected sensor outputs. Only two windings are shown, the third winding (if present) and any subsequent windings (if present) may be in freewheeling mode, for instance.

The switches 410, 411, 413, 414, corresponding to the sensor configuration shown in FIG. 4, may be ON (value 1) or OFF (value 0), so two neighboring phases may be in a configuration resulting from the combination of any of the four modes shown in FIG. 5 to FIG. 8, resulting in 4×4=16 possible combinations. The driving mode of each winding may be powering (pow), one of the two possible freewheeling modes (fw) or inversion (inv).

TABLE 1

| 410 | 413 | 411 | 414 | Coil 404 | Coil 405 | Sensor | Sensor | Volt in coil 404 | Volt in coil 405 | mode |
|---|---|---|---|---|---|---|---|---|---|---|
| 0 | 0 | 0 | 0 | Inv | Inv | LS | LS | −V | −V | 1 |
| 0 | 0 | 0 | 1 | Inv | Fw | LS | LS | −V | 0 | 2 |
| 0 | 0 | 1 | 0 | Inv | Fw | LS | HS | −V | 0 | 3 |
| 0 | 0 | 1 | 1 | Inv | Pow | LS | HS | −V | V | 4 |
| 0 | 1 | 0 | 0 | Fw | Inv | LS | LS | 0 | −V | 5 |

TABLE 1-continued

| 410 | 413 | 411 | 414 | Coil 404 | Coil 405 | Sensor | Sensor | Volt in coil 404 | Volt in coil 405 | mode |
|---|---|---|---|---|---|---|---|---|---|---|
| 0 | 1 | 0 | 1 | Fw | Fw | LS | LS | 0 | 0 | 6 |
| 0 | 1 | 1 | 0 | Fw | Fw | LS | HS | 0 | 0 | 7 |
| 0 | 1 | 1 | 1 | Fw | Pow | LS | HS | 0 | V | 8 |
| 1 | 0 | 0 | 0 | Fw | Inv | HS | LS | 0 | −V | 9 |
| 1 | 0 | 0 | 1 | Fw | Fw | HS | LS | 0 | 0 | 10 |
| 1 | 0 | 1 | 0 | Fw | Fw | HS | HS | 0 | 0 | 11 |
| 1 | 0 | 1 | 1 | Fw | Pow | HS | HS | 0 | V | 12 |
| 1 | 1 | 0 | 0 | Pow | Inv | HS | LS | V | −V | 13 |
| 1 | 1 | 0 | 1 | Pow | Fw | HS | LS | V | 0 | 14 |
| 1 | 1 | 1 | 0 | Pow | Fw | HS | HS | V | 0 | 15 |
| 1 | 1 | 1 | 1 | Pow | Pow | HS | HS | V | V | 16 |

Driving a motor using PWM may follow different schemes according to embodiments of the present invention.

In the following examples, the switches are turned ON (state 1 in the logic table hereinabove) using a series of pulses with certain periodicity, which depends on each particular application. As an exemplary value, the PWM frequency may be for example 20 kHz, but the present invention is not limited to this value. Four exemplary schemes are explained in relation to the configuration of FIG. 4, following some of the driving modes shown in Table 1. It is an advantage of using these four schemes when driving two coils in overlapping mode (at macro-level), because it allows both currents to be driven independently, and to be measured independently in each PWM-cycle. These four schemes follow a "soft chopping"-type: the LS transistor (of the two windings in question) is kept in an ON state at all times, advantageously improving efficiency and power factor of the winding (ratio between the real power and the apparent power), while reducing torque ripple and noise level. Nonetheless other schemes may be possible, including schemes based on "hard chopping" driving.

First Scheme:

A first possible scheme comprises keeping the LS switches of the first and second winding ON (so 413 and 414 will be assigned with logical "1") for the whole cycle, via a series of pulses (hence, driving via PWM). The actual duration of the cycle depends on different factors, like the motor speed and overlapping angle. The HS switch 410 of winding 404 may be ON a first interval of the duration of the cycle, and the HS switch 411 of winding 405 may be ON during another interval of the duration of the cycle. The interval duration depends on factors like the time needed to measure the current, the ADC conversion time, etc.

As a non-limiting example, if the controller is able to convert the current e.g. in 2.5 microseconds, this time interval relates to 5% of the whole PWM period when driving on 20 kHz PWM frequency. So this interval can result in parts of 5% and 95%. In another example, the intervals may result in parts of ¼ and ¾ of the whole PWM period. The present invention is not limited to these examples, and other intervals and PWM frequencies may be used.

This will result in the steps of driving a first winding 404, current sensing, and driving a second winding 405 and current sensing, according to embodiments of the present invention. During this exemplary cycle, the motor will be driven under (modes as indicated in Table 1):

a) mode 14 for a given interval of the duration of the cycle
b) mode 16 for another interval of the duration of the cycle
c) mode 8 for another interval of the duration of the cycle.

In embodiments of the present invention, the signals of neighboring phases may be inverted with respect each other, creating phase conduction modes in the overlapping region that allow the measurement of two currents. For instance, the PWM pulse of a phase may be left aligned, while the PWM pulse of the neighboring phase may be right aligned. This enables to create phase conduction modes in the overlapping region that allows to measure two currents.

Figure 16:
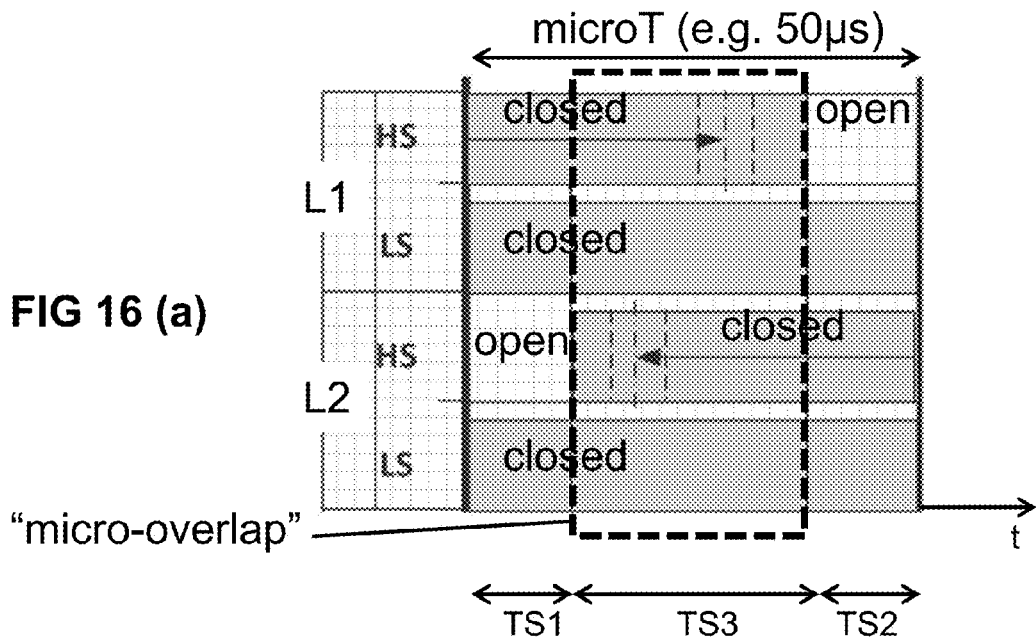
FIG. 16(a) illustrates a PWM scheme (with micro-overlap in the middle) having a relatively large first and second aspect ratio (duty cycle), as can be used to increase both phase currents through a first and second winding. There is also a portion (at the left of the figure) where only the first winding is energized, and a portion (at the right of the figure) where only the second winding is energized. As will be explained further, the current through the first and second winding can be measured in these left and right portions.
FIG. 16(b) shows an example of how the transistors can be configured for measuring the current of the second winding, in a circuit having a single current sensor arranged as in FIG. 13.
FIG. 16(c) shows an example of how the transistors can be configured for measuring the current of the first winding, in a circuit having a single current sensor arranged as in FIG. 13.
Figure 16:
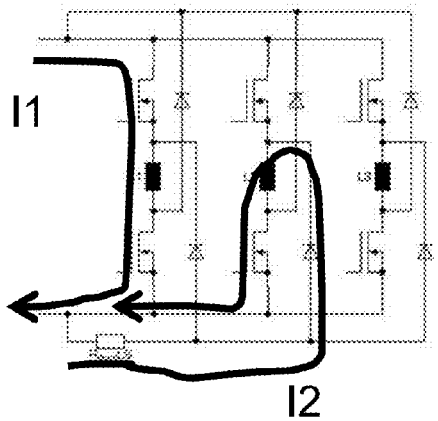
Figure 16:
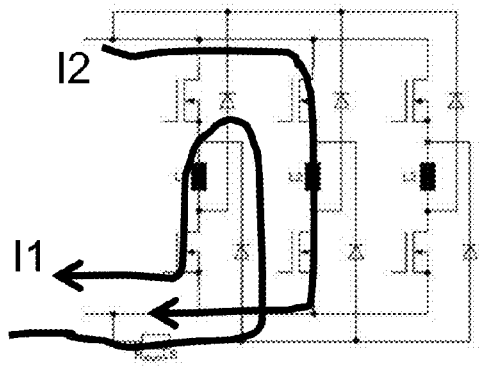

An example of this scheme is illustrated in FIG. 16(a). The example is shown for coil L1 and L2, but is also applicable to other pair of motor windings being driven in "macro-overlapping mode".

In the first part a) of the cycle (time slot TS1 in FIG. 16(a)), the first winding 404 (L1) is powered and the second winding 405 (L2) is not driven, but is in freewheeling mode (e.g. through its low-side diode, see FIG. 16(b)). The current sensor 1201 (if present) and 1502 (if present) will output a value representative for the current I1 flowing through the first winding 404 (L1) during this first time slot TS1. The current sensor 1302 (if present) and 1401 (if present) will output a value representative for the current I2 flowing through the second winding 405 (L2) during this first time slot TS1.

The second winding 405 is in freewheeling mode, and due to the configuration of the freewheeling diodes 421, 424, the only detectable current would be leakage currents and currents from the induction of the second winding 405 when transferring power from the winding to the circuit (for instance, when a magnetized pole of the rotor moves away from the winding).

In the second part b) of the cycle (time slot TS3 in FIG. 16(a)), both windings 404, 405 are "simultaneously" being powered (at micro-level). The sum of the currents flowing through the first and the second windings in this configuration will be sensed by the HS sensor 401 (or 1201), but the present invention is not particularly interested in this sum signal. The LS current sensor 402 (or 1302) would measure leakage currents (from the freewheeling diodes, for instance) and other parasitic effects. In preferred embodiments of the present invention, no current measurement is performed in this time slot TS3.

Figure 17:
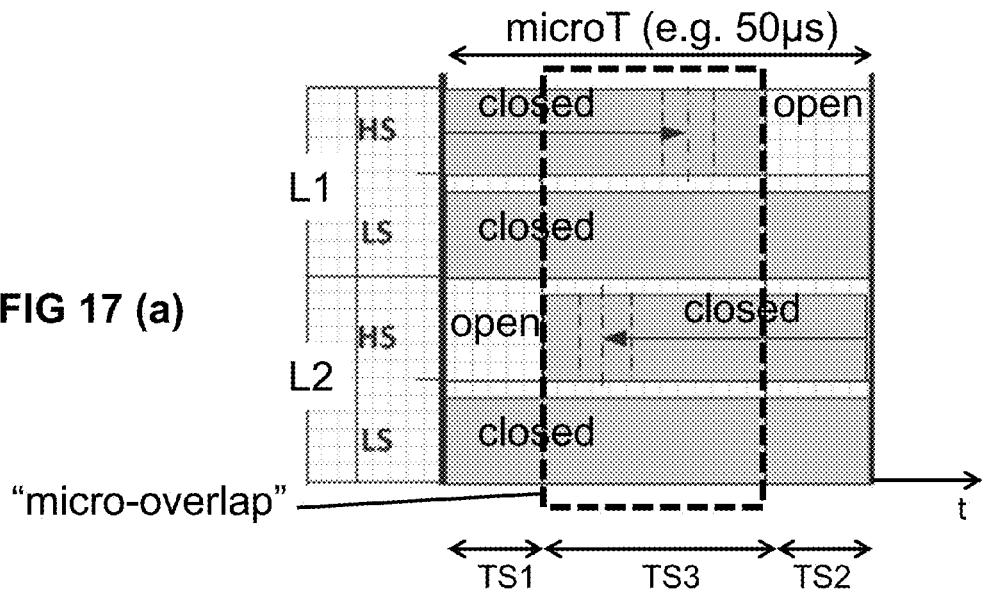
FIG. 17(a) shows the same scheme as shown in FIG. 16(a), but shows which currents flows through the current sensors of FIG. 14 and FIG. 15.
FIG. 17(b) shows an example of how the transistors can be configured for measuring the current of the first winding, in a circuit having a current sensor arranged as in FIG. 15.
FIG. 17(c) shows an example of how the transistors can be configured for measuring the current of the second winding, in a circuit having a current sensor arranged as in FIG. 15.
Figure 17:
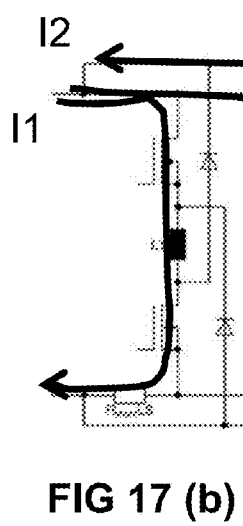
Figure 17:
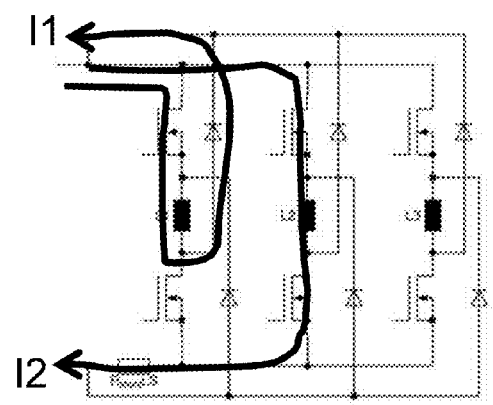

In the third part c) of the cycle (time slot TS2 of FIG. 16(a)), the first winding 404 (L1) is not driven (but is in freewheeling mode e.g. via its low-side diode in FIG. 16(c) or via its high-side diode in FIG. 17(c), etc.) but the second winding 405 is still being driven. Current LS sensor 402 (or 1302) senses the current flowing through the first winding 404 (L1). During this time slot TS2, the current I2 from the second winding 405 (L2) would be sensed by the HS sensor 401 (or 1201 in the circuit of FIG. 12).

The first and second windings L1, L2 will be powered for a given amount of time, e.g. as defined by the duty cycle "d1" of the first PWM signal (driving HS transistor 410) and the duty cycle "d2" of the second PWM signal (driving HS transistor 411). The sum of the intervals that each winding is powered may result in an amount of time higher than the cycle duration, or expressed in mathematical terms: 100%<d1+d2<200%, in which case there will be PWM overlap at micro-level. This mode can be used for increasing both the first current I1 and the second current I2.

Thus, the currents I1 and I2 are preferably only sensed in portions of the PWM cycle where the HS switch-on-time from the first phase does not overlap with the HS switch-on-time from the second phase.

Although explained with reference to the hardware of FIG. 4, the same currents can also be measured using the hardware of any of the circuits shown in FIG. 12 to FIG. 15, when driven according to the same scheme. FIG. 16(a) and FIG. 16(b) indicate which current can be measured by which current sensor in the time slot TS1 and TS2.

Figure 18:
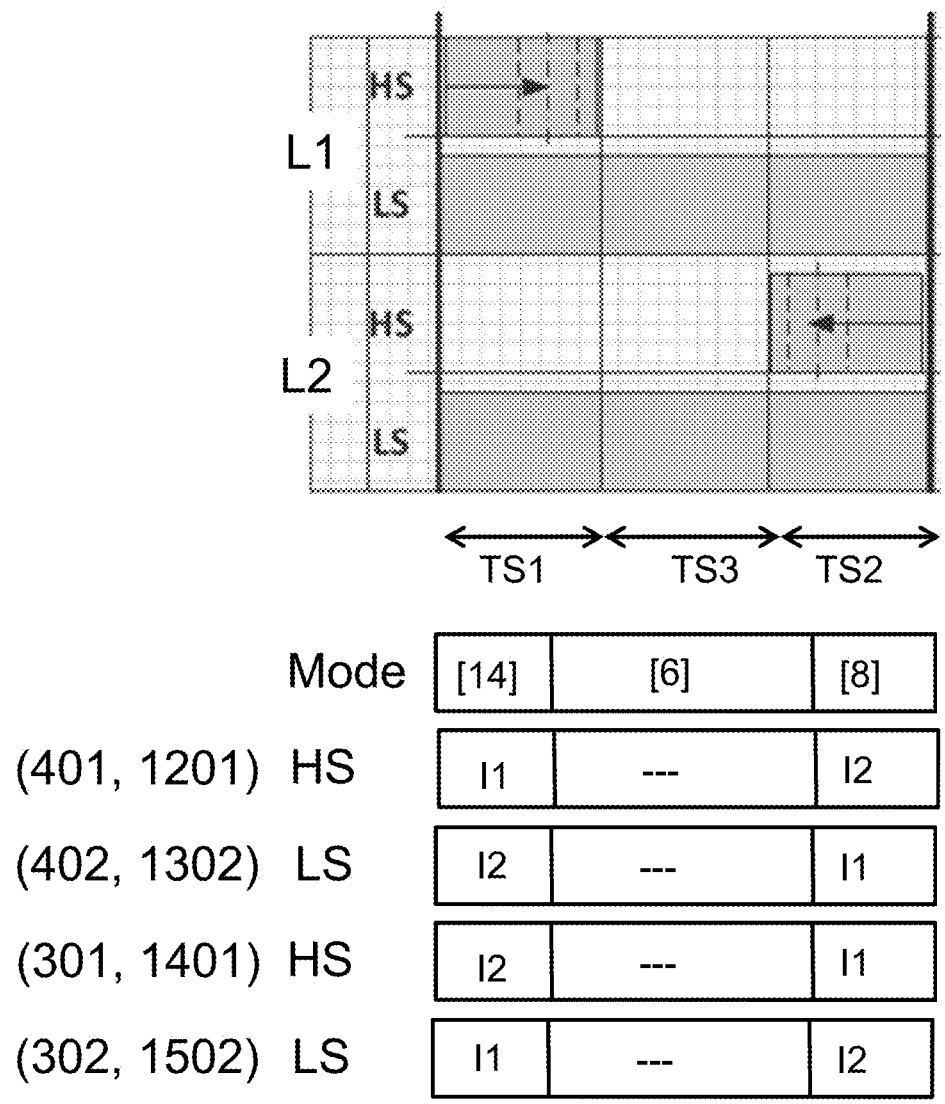
FIG. 18 is a variant of FIG. 16(a,b), and illustrates a PWM scheme (without micro-overlap in the middle) having a relatively small first and second aspect ratio (duty cycle), as can be used to decrease both phase currents. There is a portion (at the left of the figure) where only the first winding is energized, and a portion (at the right of the figure) where only the second winding is energized, in which left and right portions the current through the first and second winding can be measured using a single current sensor. It is also shown which current can be measured during which time slots, using any of the circuit arrangements of FIG. 12 to FIG. 15.

Second Scheme:

Referring to the circuit of FIG. 4, and to the scheme of FIG. 18, a second possible scheme comprises keeping ON the LS switches 413, 414 of the first and second windings 404, 405 (so switches 413 and 414 will be assigned with logical "1") for the whole cycle. The HS switch 410 of the first winding 404 may be ON during a first interval TS1 of the duration of the cycle, and the HS switch 411 of the second winding 405 may be ON during another interval TS2 of the duration of the cycle. If the sum of the duty cycles d1 of TS1 and d2 of TS2 is smaller than 100%, then during a part TS3 of the period (e.g. PWM period), none of the coils is being driven. This will result in the method-steps of driving a first winding 404, current sensing during TS1, not driving any of the windings during TS3 (and optionally current sensing, but not required), and driving a second winding 405 and current sensing during TS2, according to embodiments of the present invention. This scheme is particularly useful to decrease both I1 and I2.

During this exemplary cycle, the motor will be driven under (modes as indicated in Table 1):
a) mode 14 during interval TS1 of the duration of the cycle
b) mode 6 during interval TS3 of the duration of the cycle
c) mode 8 during interval TS2 of the duration of the cycle.

The first part a) (time slot TS1) of the cycle is analogous to the first part of the cycle according to the previous scheme, in the sense that only the first coil is being driven, and in that during this time slot one of the currents I1 or I2 can be measured, (which of the currents I1 or I2 is actually being measured, depends on the position of the single current sensor, in other words, on which of the hardware arrangements of FIG. 3, FIG. 4, FIG. 12, FIG. 13, FIG. 14, FIG. 15 is being used).

In the second part b) both windings 404, 405 are freewheeling (i.e. are not being driven). The LS switches 413, 414 are ON but the HS switches 410, 411 are OFF. They are not powered due to, as before, the configuration of the freewheeling diodes. Any current sensed by, in case of the configuration shown in FIG. 4, the HS sensor 402 would stem from the back-electromotive force or parasitic current effects. The LS sensor will sense the sum of the active currents from the first and the second phase. In preferred embodiments of the present invention, the current is not sensed during this period TS3 (as indicated by the dashes in FIG. 18).

The third part c) (time slot TS2) is analogous to the third part of the cycle according to the previous scheme.

Figure 19:
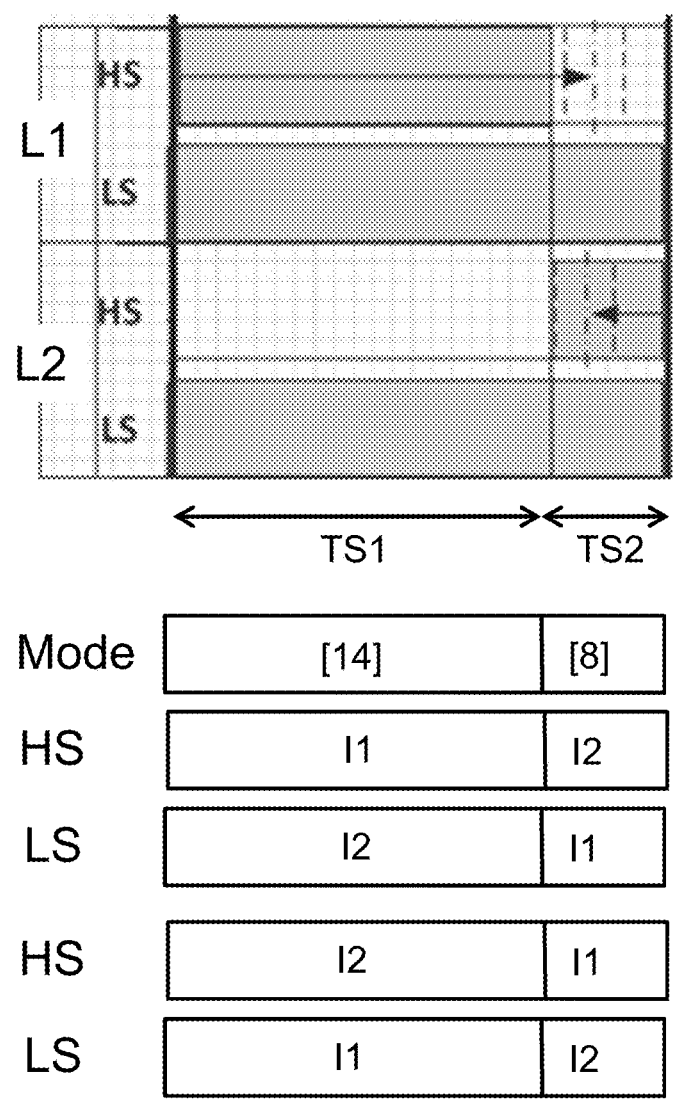
FIG. 19 is another variant of FIG. 16(a,b), and illustrates a PWM scheme (without micro-overlap) having a relatively large portion (left aligned in the PWM cycle) where the first winding is energized, and a relatively small portion (right aligned in the PWM cycle) where the second winding is energized, as can be used to increase the first current and to decrease the second current. It is also shown which current can be measured during which time slots, using any of the circuit arrangements of FIG. 12 to FIG. 15.

Third Scheme:

Referring to the circuit of FIG. 4, and to the scheme of FIG. 19, a third possible scheme comprises keeping ON the LS switches 413, 414 of the first and second windings 404, 405 (so 413 and 414 will be assigned with logical "1") for the whole cycle (e.g. PWM-cycle). The HS switch 401 of first winding 404 may be ON during a first interval TS1 of the duration of the cycle, and the HS switch 411 of second winding 405 is ON during the remainder TS2 of the duration of the cycle. The sum of the first duty cycle d1 and the second duty cycle d2 is equal to 100% in this case. This will result in the steps of driving the first winding 404 in time slot TS1, current sensing in TS1, and driving the second winding 405 in time slot TS2 and current sensing in TS2, according to embodiments of the present invention. In this scheme, the first duty cycle d1 is typically chosen larger than the second duty cycle d2. This scheme is particularly useful to increase I1 while decreasing I2.

During this exemplary cycle, the motor will be driven under (modes as indicated in Table 1):
a) mode 14 during interval TS1 of the duration of the cycle
b) mode 8 during interval TS2 of the duration of the cycle The modes have been discussed in previous schemes. Additionally, the HS switches 410, 411 change their mode at the same point of time.

Each winding 404, 405 in this scheme may be driven during a different amount of time than the other winding, but the combined time of the driving in both windings equals the whole cycle duration (d1+d2=100%).

Figure 20:
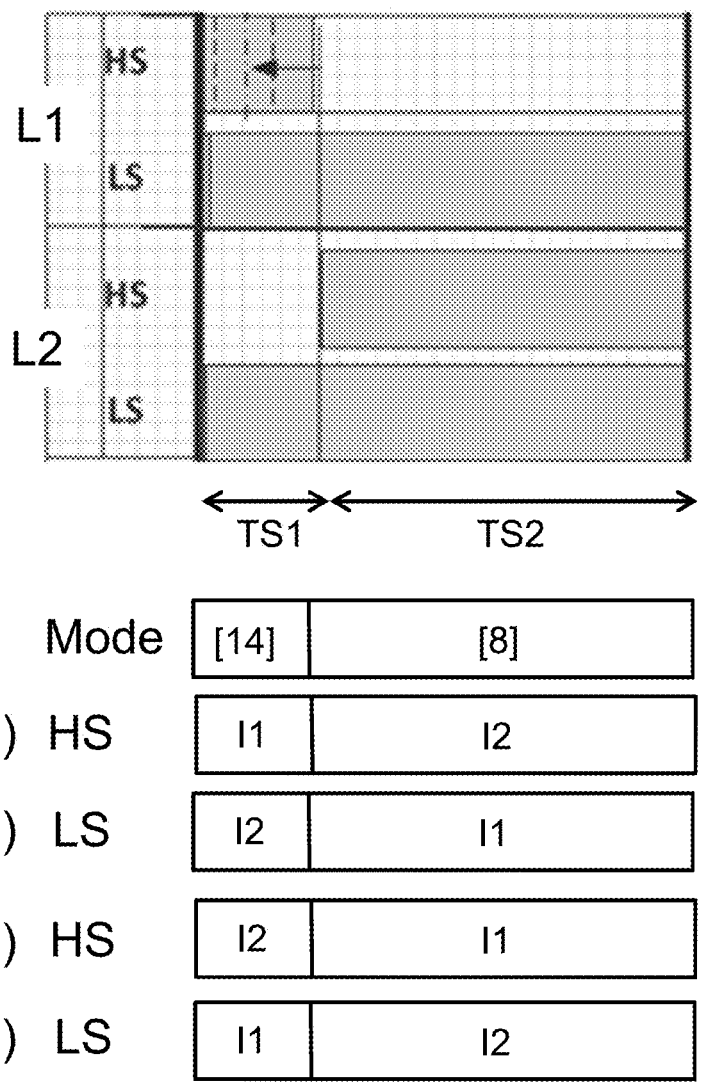
FIG. 20 is yet another variant of FIG. 16(a,b), and illustrates a PWM scheme (without micro-overlap) having a relatively small portion (left aligned in the PWM cycle) where the first winding is energized, and a relatively large portion (right aligned in the PWM cycle) where the second winding is energized, as can be used to decrease the first current and to increase the second current. It is also shown which current can be measured during which time slots, using any of the circuit arrangements of FIG. 12 to FIG. 15.

Fourth Scheme:

Referring to the circuit of FIG. 4, and to the scheme of FIG. 20, a fourth possible scheme comprises keeping ON the LS switches 413, 414 of the first and second winding 404, 405 (so 413 and 414 will be assigned with logical "1") for the whole cycle. The HS switch 410 of the first winding 404 may be ON during a first interval TS1 of the duration of the cycle, and the HS switch 411 of the second winding 405 may be ON during the remainder TS2 of the duration of the cycle. The sum of the first duty cycle d1 and the second duty cycle d2 is equal to 100% in this case. This will result in the steps of driving the first winding 404 in time slot TS1, current sensing in TS1, and driving the second winding 405 in time slot TS2 and current sensing in TS2, according to embodiments of the present invention. This scheme is very similar to the third scheme, except that the first duty cycle d1 is typically smaller than the second duty cycle d2 in this case. This scheme is particularly useful to decrease I1 while increasing I2.

Once understood, these four schemes are extremely simple to implement on a controller 330, 430, 1230, 1330, 1430, 1530 as shown in any of FIG. 3, FIG. 4, FIG. 12 to FIG. 15, by choosing a first duty cycle value d1 and a second duty cycle value d2, and by configuring the PWM1 module with the first duty-cycle value d1 in a left-aligned mode, and by configuring the PWM2 module with the second duty-cycle value d2 in a right-aligned mode, and by appropriately configuring or overruling the third PWM-module (or any other PWM modules), and correctly setting the LS-transistors, depending on which particular hardware configuration is chosen (any of FIG. 3 or FIG. 4 having two current sensors, or any of the circuits of FIG. 12 to FIG. 15 having only a single current sensor). It is noted in this respect that the topology of FIG. 3 can be seen as a combination of the topologies of FIG. 14 and FIG. 15, and that the topology of FIG. 4 can be seen as a combination of the topologies of FIG. 12 and FIG. 13).

If the duty cycles d1, d2 are chosen in the range of for example about 2% to about 98%, or in the range of about 5% to about 95%, or in the range of about 10% to about 90%, it can be guaranteed that the duration of the first and second time slots TS1, TS2 are at least 2% or at least 5%, or at least 10% of the PWM period, during which period the current can be measured. The skilled person can choose the minimum and maximum values sufficiently large for allowing the current sensor(s) to be read-out (taking into account for example timing of ADC or amplifiers etc). The skilled person can readily select suitable values, or find suitable values by trial and error.

Some embodiments of the present invention configured to drive the motor in overlapping mode (at macro level), are configured to only use the modes [14], [16], [6] and [8] (described above), and no other modes from Table 1, for driving the motor, with d1 and d2 being selected sufficiently large (for example at least 1/16 or at least 1/32) to enable a current measurement in both TS1 and TS2, while allowing a net decrease of the current after the PWM-period. Such embodiments offer the advantage that the two currents I1, I2 can be sampled (measured) in each and every PWM-cycle, thereby allowing both a simple algorithm and accurate control of the currents during phase overlapping mode (at macro level).

Figure 23:
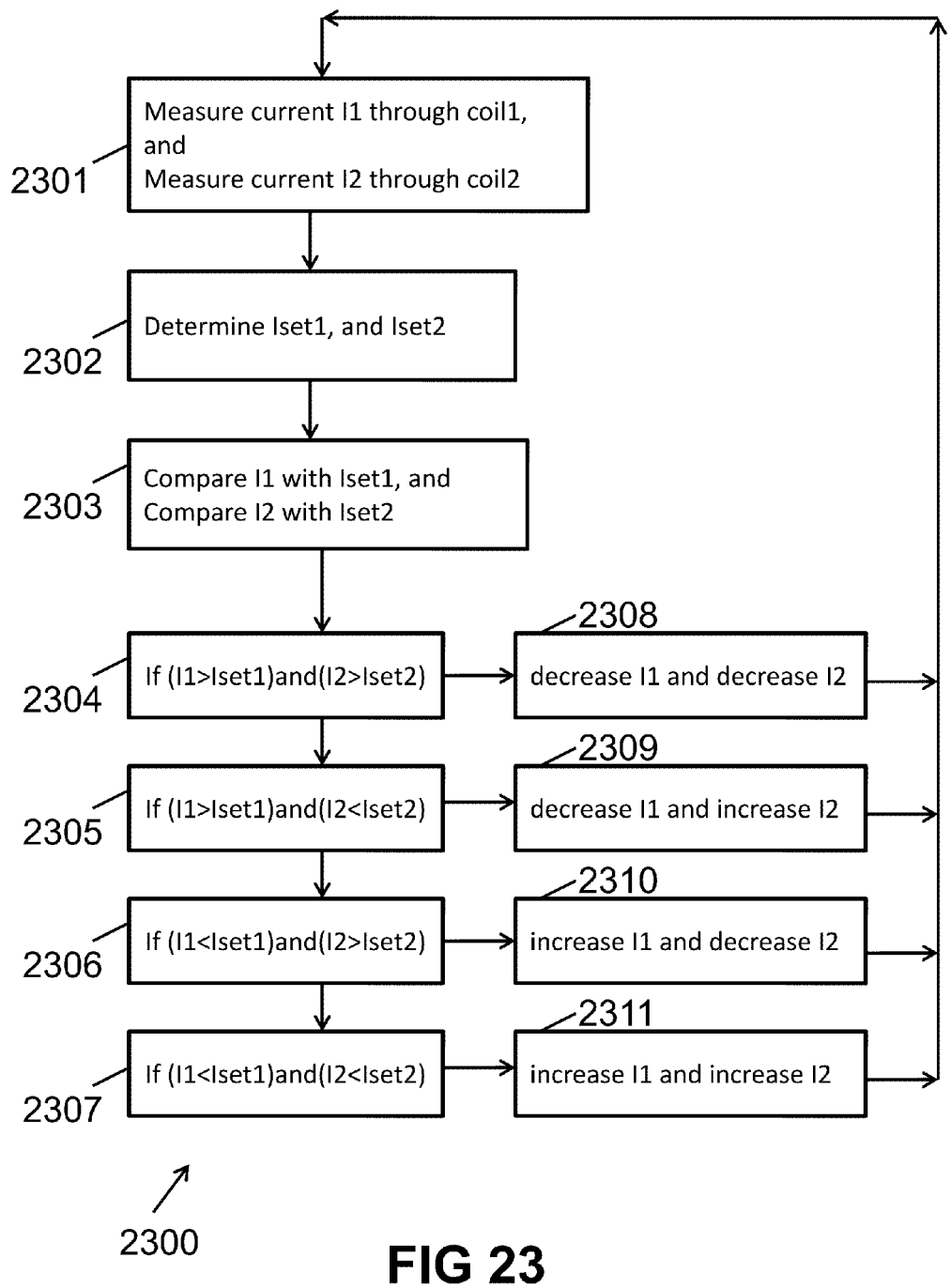
FIG. 23 shows a method as can be used during the "macro overlap period" of FIG. 22, for driving the currents in the first and second winding.

A method of driving the currents I1 and I2 through the coils L1 and L2 such that (at macro-level) they follow predefined waveforms, e.g. trapezoidal non-overlapping waveforms as shown in FIG. 21 or trapezoidal overlapping waveforms as shown in FIG. 22, may then be implemented by determining, e.g. calculating at discrete time "k" a first target value Iset1 for the first current I1, and a second target value Iset2 for the second current I2, and by comparing the current I1 measured in the previous PWM-cycle with Iset1, and determining an appropriate value for d1 depending on whether I1 is larger or smaller than Iset1 (and thus whether I1 needs to decrease or increase), and determining an appropriate value for d2 depending on whether I2 is larger or smaller than Iset2 (and thus whether I2 needs to decrease or increase). Once d1 and d2 are chosen, the time slots TS1 and TS2 are known determined, and the controller (e.g. the processor thereof) can determine an appropriate moment for measuring the single current sensor (circuit of FIG. 12 to FIG. 15) or current sensors (circuit of FIG. 3 or FIG. 4). An embodiment of this method is illustrated in FIG. 23.

Other possibilities include driving in "non-phase overlap" (at macro-level) but with equal durations of the modes. This would however not allow the two currents to be measured in each PWM-cycle, which may result in a more complex control, and/or a less accurate control.

In case of the circuit of FIG. 3 or FIG. 4, as the HS and LS current sensors 401, 402 automatically detect changes of mode corresponding to the time interval in which the motor is in phase overlapping or non-overlapping mode, there is no need to switch between the HS and LS current sensor 401, 402.

Alternative Schemes:

In FIG. 16 to FIG. 20, it is assumed that the LS transistor is always ON, while the HS transistors (of the two coils in question) is being pulsed. Of course, the same effect can be obtained by keeping the HS transistor always ON, while the LS transistors (of the two coils in question) are being pulsed. Although not worked out in detail, it will be clear that similar schemes as worked out in FIG. 16 to FIG. 20 can also be worked out for this case. Also with such a scheme, it Is possible to measure the first current I1 and second current I2 in different portions of the PWM-cycle. In this case, the PWM-modules of the controllers in FIG. 12 to FIG. 15 would be connected to the LS transistors, and the HS transistors could be driven by GPIO-pins.

Figure 11:
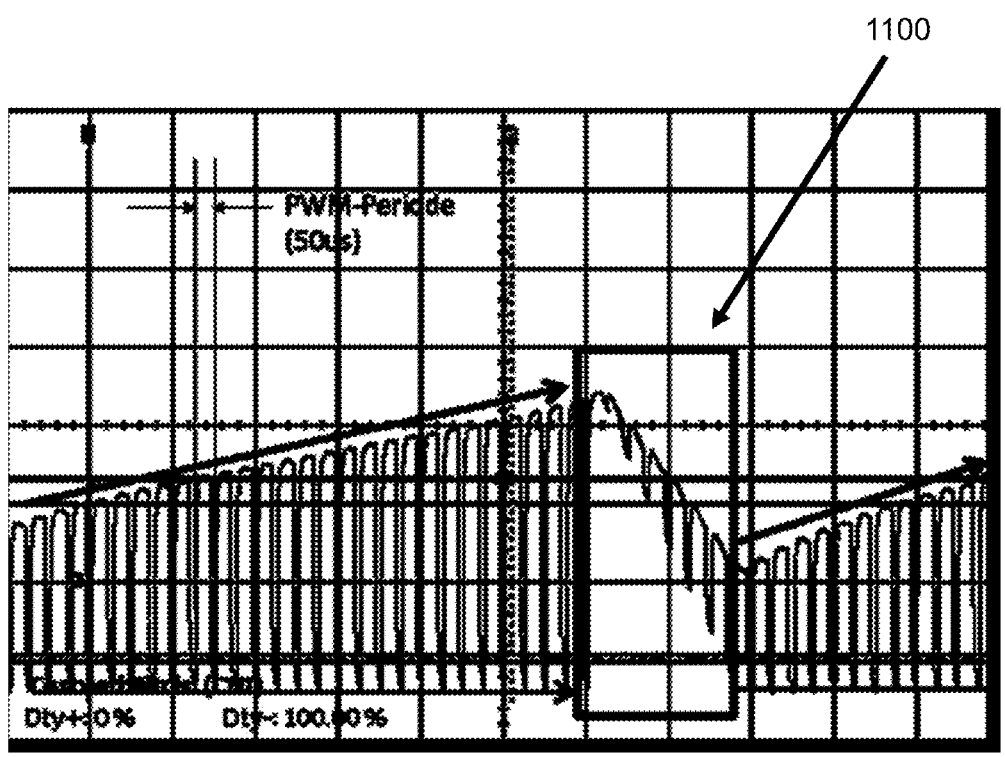
FIG. 11 shows the current through one sensor for a system being driven with non-phase overlap (at macro level). In this case only a single current is flowing through the windings, the amplitude of which can be controlled by means of a PWM signal.

FIG. 11 shows the current through one sensor (e.g. LS sensor) for a system being driven with "non-phase overlap" (see FIG. 21) during one cycle of pre-determined duration. Each of the ripples in the curve corresponds to a pulse of the PWM. In embodiments of the present invention, each ripple would correspond to e.g. the output 1021 of the LS sensor in FIG. 10. Other values and configurations are possible in the present invention. The central squared area marked with arrow 1100 shows the transition between two phases, from ON to OFF, in one of the switches from one phase to the next with a phase overlap stemming from the non-zero transition time of the current to the OFF state. During this time in which the current from one phase drops to zero, the other phase starts. The particular shape observed in the marked area is the sum of the two currents as detected in one sensor. Hence, the falling part in the marked rectangle shows the current when changing switch configuration between two opposite alignments: the detected current is a mix of falling current from the first phase and the rising current from the second phase. It is an advantage of embodiments of the present invention that the contribution of the two summed currents from the first and second phase can be detected and control can be improved.

In embodiments of the present invention, the sensed current may also be utilized as a test for open circuits, leakage currents, changes in resistance and other undesirable effects. Additionally, it can be used to correct the currents with amplifiers, feedback loop, etc.

Switching between the four described schemes from cycle to cycle allows the control of currents in a similar way of a two-point-controller. Additionally to this feature, any suitable current controller may also be used to control the currents. An algorithm may be implemented so that the currents are measured in the regions in which individual phases do not overlap (non PWM overlap regions, which may be for example at the beginning and end of the PWM period). Current regulation may be enabled by a controller. Particular embodiments of the present invention may include a controller, for instance but not limited to a Proportional-Integral (PI) controller, a two-point controller, a Slide-Mode controller (SMC), the present invention not being limited to these examples. A current comparator may also be comprised in embodiments of the present invention, or a controller may be used as comparator. Hence, in embodiments of the present invention, the unambiguous measurement and reconstruction of two phase currents within several PWM periods is enabled during a complete cycle of a motor driven in phase overlap mode.

As an example, according to particular embodiments of the present invention, a motor may be driven by PWM and phase overlap. Current control may comprise current sensing according to embodiments of the present invention, current comparison by means of a current comparator, and current regulation by means of a two-point controller.

In case the current in every winding is lower than an expected (predefined) value, a high PWM is introduced in the driving circuit. The first scheme, described before, is an example of an implementation of this feature.

In case the current in every winding is higher than an expected (predefined) value, a low PWM is introduced in the driving circuit. The second scheme, described before, is example of an implementation of this feature.

In case the current through a first winding is lower than the expected value, and the current through a second winding is higher than the expected value, a high PWM is introduced in the first winding driver and a low PWM is introduced in the second winding driver. This may be done for instance following the third driving scheme.

In case the current through a first winding is higher than the expected value, and the current through a second winding is lower than the expected value, a low PWM is introduced in the first winding driver and a high PWM is introduced in the second winding driver. The fourth driving scheme, described before, is an example of implementation of this feature.

Other embodiments using phase-overlapping, PI control, feedback loops and other possible combinations of features available in the state of the art are possible within embodiments of the present invention.

The circuits of FIG. 12 to FIG. 15 having only a single current sensor were already discussed above.

When comparing the schemes of FIG. 16(a), 17(a), and FIG. 18 to FIG. 20, it can be seen for example that, in case the sensor 1201 is present (at the location as shown in FIG. 12), the first current I1 can be measured in time slot TS1, and the second current I2 can be measured in time slot TS2, for all the four schemes. Thus if the circuit of FIG. 12 is chosen, the current I1 can always be measured in TS1 irrespective of which of the four schemes is being used. And the current I2 can always be measured in TS2, irrespective of which of the four schemes is being used. This fact can further simplify the implementation, because it implies that the means for reading the sensor 1236, 1336, 1436, 1536 need not known which of the four schemes is being applied by the PWM-modules, it only needs to run synchronously with the PWM-modules.

From the above, it should be clear that the sensor 302 of FIG. 3 fulfills the same role as the sensor 1502 of FIG. 15, and that the sensor 301 of FIG. 3 fulfills the same role as the sensor 1401 of FIG. 14. Since both sensors are present in the circuit of FIG. 3, both the value of I1 and I2 can be measured during the first time slot TS1, and both values I1 and I2 can be measured during the time slot TS2, if so desired. It is an advantage of such embodiment that the current I1 can be measured twice in each PWM-cycle: once with sensor 301 and again with sensor 302, which enables fault detection, thus making the motor drive circuit more robust. A similar reasoning applies for the circuit of FIG. 4, mutatis mutandis.

In the examples described above, mode[14] was used in a time slot TS1 and is left-aligned in the PWM-cycle, and mode[8] was used in a time slot TS2 and is right-aligned in the PWM-cycle, but of course this alignment can be swapped, so that the mode[8] is left-aligned, and the mode [14] is right-aligned.

In a third aspect, the present invention also relates to a computer program product for executing any of the methods described above on a programmable digital processor in a controller 330, 430, 1230 1330, 1430, 1530.

In a fourth aspect, the present invention also relates to a hardware description program product, directly downloadable to a programmable hardware device such as for example an FPGA (field programmable gate array) or CPLD (complex programmable logic device), the hardware description program product being adapted for performing any of the methods described above. Such devices are commercially available from vendors such as Altera or Xilinx.

The circuit and method according to embodiments of the present invention may be implemented in a brushless DC motor, for example a switched-reluctance motor (SRM). Advantages of these motors are their long lifespan, low maintenance and high efficiency.

Embodiments of the present invention may be also applied to electrical actuators, generators, motors, etc.

In summary, the present invention discloses a circuit for controlling a multiphase motor, in particular an SRM motor, comprising for each winding a low-side and a high-side transistor, and a low-side and a high-side diode, and at least one current sensor 201, 202, e.g. a single current sensor, arranged in low-side or in high-side implementation for measuring a current I1, I2 through a first and second winding L1, L2, and a controller 230 adapted for configuring the transistors such that: during a first time slot TS1 only a first winding L1 (of a pair of windings of the motor) is energized while the second windings L2 is freewheeling via a selected freewheeling path; and during a second time slot TS2 only the second winding L2 (of a pair of windings of the motor) is energized while the first winding L1 is freewheeling via a selected freewheeling path, and for measuring the first and second current in said time slots TS1, TS2. This method is especially suited for driving the motor in phase-overlapping mode (at macro-level). The drive signals can conveniently be implemented as left- and right-aligned PWM signals. The present invention also relates to a method of driving the motor using a left-aligned and right-aligned PWM-signal, as described above.

Although the principles of the invention are described for a first current I1 in a first coil and a second current I2 in a second coil, while no current is running in a third coil, it will be clear to the skilled person that the two current signals being driven and being measured can for example be the currents I1 and I2 through coils L1 and L2 during one PWM period within the macro overlapping between phase 1 and phase 2, the currents I2 and I3 through coils L2 and L3 during one PWM period within the macro overlapping between phase 2 and phase 3, the currents I3 and I1 through coils L3 and L1 during one PWM period within the macro overlapping between phase 3 and phase 1, etc.

The invention claimed is:

1. A circuit for controlling a multiphase motor, the motor comprising a plurality of windings comprising at least a first winding and a second winding, the circuit comprising:
for each winding, a low-side transistor and a high-side transistor for allowing the windings to be energized;
for each winding, a low-side diode and a high-side diode for allowing the winding to freewheel from the low-side to the high-side when said winding is not being energized;
a controller for driving the low-side transistors and the high-side transistors; and
only one or only two current sensors arranged in one of the following configurations:
a single current sensor arranged between supply and each of the high-side transistors, or
a single current sensor arranged between ground and each of the low-side diodes, or
a single current sensor arranged between supply and each of the high-side diodes, or
a single current sensor arranged between ground and each of the low-side transistors, or
a first current sensor arranged between ground and each of the low-side transistors and a second current sensor arranged between supply and each of the high-side diodes, or a first current sensor arranged between ground and each of the low-side diodes and a second current sensor arranged between supply and each of the high-side transistors, for selectively measuring a first current running through said first winding and a second current running through said second winding;

wherein the controller is adapted for repeatedly configuring the low-side transistors and the high-side transistors in such a way that:

during a first time slot only the first winding is energized, while the second winding is freewheeling via a freewheeling path chosen such that only the first current of the first winding or only the second current of the second winding is flowing through said single current sensor, or said first current sensor, or said second current sensor;

during a second time slot only the second winding is energized while the first winding is freewheeling via a freewheeling path chosen such that only the other of the first and second current is flowing through the same current sensor as was used for measuring the first current; and wherein the controller is further adapted for measuring one of the first and second current during said first time slot using said single current sensor, or said first current sensor, or said second current sensor, and for measuring the other of said first and second current during said second time slot using the same current sensor.

2. The circuit according to claim 1,
wherein a single current sensor is arranged between ground and each of the low-side diodes,
and wherein the control unit is adapted for configuring the switches transistors in such a way that:
during the first time slot only the first winding is energized while the second winding is freewheeling via its low-side diode such that only the second current of the second winding is flowing through the current sensor;
during the second time slot only the second winding is energized while the first winding is freewheeling via its low-side diode such that only the first current of the first winding is flowing through the current sensor;
and wherein the controller is further adapted for measuring the second current during said first time slot using said current sensor, and for measuring the first current during said second time slot using the single current sensor.

3. The circuit according to claim 1,
wherein a single current sensor is arranged between ground and each of the low-side transistors,
and wherein the control unit is adapted for configuring the transistors in such a way that:
during the first time slot only the first winding is energized while the second winding is freewheeling via its high-side diode such that only the first current of the first winding is flowing through the current sensor;
during the second time slot only the second winding is energized while the first winding is freewheeling via its high-side diode such that only the second current of the second winding is flowing through the current sensor;
and wherein the controller is further adapted for measuring the first current during said first time slot using said current sensor, and for measuring the second current during said second time slot using the single current sensor.

4. The circuit according to claim 1,
wherein a single current sensor is arranged between supply and each of the high-side diodes,
and wherein the control unit is adapted for configuring the transistors in such a way that:
during the first time slot only the first winding is energized while the second winding is freewheeling via its high-side diode such that only the second current of the second winding is flowing through the current sensor;
during the second time slot the second winding is energized while the first winding is freewheeling via its high-side diode such that only the first current of the first winding is flowing through the current sensor;
and wherein the controller is further adapted for measuring the second current during said first time slot using said current sensor, and for measuring the first current during said second time slot using the single current sensor.

5. The circuit according to claim 1,
wherein a single current sensor is arranged between supply and each of the high-side transistors,
and wherein the control unit is adapted for configuring the transistors in such a way that:
during the first time slot only the first winding is energized while the second winding is freewheeling via its low-side diode such that only the first current of the first winding is flowing through the current sensor;
during the second time slot only the second winding is energized while the first winding is freewheeling via its low-side diode such that only the second current of the second winding is flowing through the current sensor;
and wherein the controller is further adapted for measuring the first current during said first time slot using said current sensor, and for measuring the second current during said second time slot using the single current sensor.

6. The circuit according to claim 1,
wherein the at least one current sensor consists of a first current sensor and a second current sensor, the first current sensor being arranged between supply and each of the high-side transistors, the second current sensor being arranged between ground and each of the low-side diodes,
and wherein the controller is adapted for configuring the transistors in such a way that:
during the first time slot only the first winding is energized while the second winding is freewheeling via its low-side diode such that only the first current is flowing through the first current sensor and such that only the second current of the second winding is flowing through the second current sensor;
during the second time slot only the second winding is energized while the first winding is freewheeling via its low-side diode such that only the first current of the first winding is flowing through the second current sensor and such that only the second current of the second winding is flowing through the first current sensor;
and wherein the controller is further adapted for measuring a first version of the first current during said first time slot using said first current sensor, and for measuring a first version of the second current during said first time slot using said second current sensor, and for measuring a second version of the first current during said second time slot using said second current sensor, and for measuring a second version of the second current during said second time slot using said first current sensor;

and wherein the controller is further adapted for taking a predefined action based on the first version and second version of the first and second current values.

7. The circuit according to claim 1,
wherein the at least one current sensor consists of a first current sensor and a second current sensor, the first current sensor being arranged between supply and each of the high-side diodes, the second current sensor being arranged between ground and each of the low-side transistors, and wherein the controller is adapted for configuring the transistors in such a way that:
during the first time slot only the first winding is energized while the second winding is freewheeling via its high-side diode such that only the first current of the first winding is flowing through the second current sensor and such that only the second current of the second winding is flowing through the first current sensor;
during the second time slot only the second winding is energized while the first winding is freewheeling via its high-side diode such that only the first current of the first winding is flowing through the first current sensor and such that only the second current of the second winding is flowing through the second current sensor;

and wherein the controller is further adapted for measuring a first version of the first current during said first time slot using said second current sensor, and for measuring a first version of the second current during said first time slot using said first current sensor, and for measuring a second version of the first current during said second time slot using said first current sensor, and for measuring a second version of the second current during said second time slot using said second current sensor;

and wherein the controller is further adapted for taking a predefined action based on the first version and second version of the first and second current values.

8. The circuit according to claim 1, wherein the transistors are MOSFETS.

9. The circuit according to claim 1, wherein the current sensors comprise at least one shunt resistor-type sensor.

10. The circuit according to claim 1, wherein the controller is further adapted for:
determining a target value for the first current and a target value for the second current;
testing whether the measured first respectively second current is smaller or larger than a first respectively second target value, and depending on the result of the test, adapting the duration of the first and/or the second time period for increasing or decreasing the first and/or second current.

11. The circuit according to claim 1, wherein the controller comprises:
a first PWM-module capable of providing a left-aligned PWM-signal, and a second PWM-module capable of providing a right-aligned PWM signal, and a programmable processor programmed for or programmable hardware programmed for configuring the first PWM-module for generating a left-aligned PWM signal for controlling the high-side transistor of the first winding, and for configuring the second PWM-module for generating a right-aligned PWM signal for controlling the high-side transistor of the second winding, thereby defining a relative duration of the first and second time slot.

12. The non-transitory computer-readable medium of claim 11, wherein the implemented method further comprises the steps of:
determining a target value for the first current and a target value for the second current; and
testing whether the measured first and second current is smaller or larger than a first and second target value, and depending on the result of the test, adapting the duration of the first and/or the second time period for increasing or decreasing the first and/or second current.

13. The method according to claim 11, further comprising current regulation with an on-off controller.

14. The method according to claim 11, further comprising current regulation with either a PI-controller.

15. A method for driving a multiphase motor, the motor comprising a plurality of windings comprising at least a first winding and a second winding, using a circuit comprising:
for each winding, a low-side transistor and a high-side transistor for allowing the windings to be energized;
for each winding, a low-side diode and a high-side diode for allowing the winding to freewheel from the low-side to the high-side when said winding is not being energized;
only one or only two current sensors for selectively measuring a first current running through said first winding and a second current running through said second winding, said only one or only two current sensors being arranged in one of the following configurations:
a single current sensor arranged between supply and each of the high-side transistors, or
a single current sensor arranged between ground and each of the low-side diodes, or
a single current sensor arranged between supply and each of the high-side diodes, or
a single current sensor arranged between ground and each of the low-side transistors, or
a first current sensor arranged between ground and each of the low-side transistors and a second current sensor arranged between supply and each of the high-side diodes, or
a first current sensor arranged between ground and each of the low-side diodes and a second current sensor arranged between supply and each of the high-side transistors,
the method comprising the steps:
configuring the low-side transistors and the high-side transistors for driving the motor;
configuring the low-side transistors and the high-side transistors in such a way that:
during a first time slot only the first winding is energized while the second winding is freewheeling via a freewheeling path chosen such that only the first current of the first winding or only the second current of the second winding is flowing through the current sensor;
during a second time slot only the second winding is energized while the first winding is freewheeling via a freewheeling path chosen such that only the other of the first and second current is flowing through the same current sensor as was used for measuring the first current;

measuring one of the first and the second current during said first time slot using said single current sensor, or said first current sensor, or said second current sensor, and measuring the other of said first current and said second current during said second time slot using the same current sensor.

16. The method of claim 15, further comprising the step of:

determining a target value for the first current and a target value for the second current;

testing whether the measured first and second current is smaller or larger than a first and second target value, and depending on the result of the test, adapting the duration of the first and/or the second time period for increasing or decreasing the first and/or second current.

17. A non-transitory computer-readable medium having instructions stored thereon, which, when implemented on a processing unit, cause the processing unit to implement a method for driving a multiphase motor, the motor comprising a plurality of windings comprising at least a first winding and a second winding, using a circuit, the circuit comprising:

for each winding, a low-side transistor and a high-side transistor for allowing the windings to be energized;

for each winding, a low-side diode and a high-side diode for allowing the winding to freewheel from the low-side to the high-side when said winding is not being energized;

only one or only two current sensors for selectively measuring a first current running through said first winding and a second current running through said second winding, said only one or only two current sensors being arranged in one of the following configurations:

a single current sensor arranged between supply and each of the high-side transistors, or a single current sensor arranged between ground and each of the low-side diodes, or a single current sensor arranged between supply and each of the high-side diodes, or a single current sensor arranged between ground and each of the low-side transistors, or a first current sensor arranged between ground and each of the low-side transistors and a second current sensor arranged between supply and each of the high-side diodes, or a first current sensor arranged between ground and each of the low-side diodes and a second current sensor arranged between supply and each of the high-side transistors the method comprising the steps of:

configuring low-side transistors and the high-side transistors for driving the motor:

configuring the low-side transistors and the high-side transistors in such a way that:

during a first time slot only the first winding is energized, while the second winding is freewheeling via a freewheeling path chosen such that only the first current of the first winding or only the second current of the second winding is flowing through said at least one current sensor;

during a second time slot only the second winding is energized while the first winding is freewheeling via a freewheeling path chosen such that only the other of the first and second current is flowing through the same current sensor as was used for measuring the first current;

measuring one of the first current and the second current during said first time slot using said single, or said first current sensor, or said second current sensor, and measuring the other of said first current and said second current during said second time slot using the same current sensor.

* * * * *